US012795397B2

(12) United States Patent
Sabella et al.

(10) Patent No.: US 12,795,397 B2
(45) Date of Patent: Nov. 10, 2026

(54) OPERATOR PLATFORM INSTANCE FOR MEC FEDERATION TO SUPPORT NETWORK-AS-A-SERVICE

(71) Applicant: Intel Products IP LLC, Santa Clara, CA (US)

(72) Inventors: Dario Sabella, Gassino (IT); Samar Shailendra, Bangalore (IN); Miltiadis Filippou, Munich (DE)

(73) Assignee: Intel Products IP LLC, Santa Clara, CA (US)

( * ) Notice: Subject to any disclaimer, the term of this patent is extended or adjusted under 35 U.S.C. 154(b) by 0 days.

(21) Appl. No.: 18/216,257

(22) Filed: Jun. 29, 2023

(65) Prior Publication Data

US 2023/0362683 A1 Nov. 9, 2023

(30) Foreign Application Priority Data

Jul. 15, 2022 (IN) ............................ 202241040528

(51) Int. Cl.
*H04W 24/02* (2009.01)
*H04L 41/0823* (2022.01)
(Continued)

(52) U.S. Cl.
CPC ......... *H04W 24/02* (2013.01); *H04L 41/0823* (2013.01); *H04L 41/50* (2013.01); *H04W 4/50* (2018.02)

(58) Field of Classification Search
CPC .... H04W 12/63; H04W 24/02; H04W 88/182
See application file for complete search history.

(56) References Cited

U.S. PATENT DOCUMENTS 11,936,736 B2 * 3/2024 Lee ....................... H04L 67/133
12,095,848 B2 * 9/2024 De Foy .................. H04L 67/34
(Continued)

FOREIGN PATENT DOCUMENTS

CN 100378723 C * 4/2008 ............. G06F 40/18
CN 118018518 A * 5/2024 ........... H04L 61/255
(Continued)

OTHER PUBLICATIONS

T. Leppanen, "Distributed Artificial Intelligence with Multi-Agent Systems for MEC," 2019 28th International Conference on Computer Communication and Networks (ICCCN), Valencia, Spain, 2019, pp. 1-8, doi: 10.1109/ICCCN.2019.8846960. (Year: 2019 ).*
(Continued)

*Primary Examiner* — William D Cumming
(74) *Attorney, Agent, or Firm* — Schwegman Lundberg & Woessner, P.A.

(57) ABSTRACT

Various approaches for Multi-Access Edge Computing (MEC) and Operator Platform (OP) systems, and management of applications and services in such systems, are discussed herein. An example system is configured to coordinate operations of a MEC system and an EDGEAPP system. The system performs lifecycle management (LCM) operations of MEC and EDGEAPP applications in an Operator Platform instance in an Operator Platform domain, enabling coordination of the MEC and EDGEAPP applications in their respective systems. The system receives application data from an application client of a user equipment (UE) associated with either the MEC system or the EDGEAPP system and transmits the application data to an application host associated with (e.g., executed on) the other system. The system thus enables LCM of respective apps and communications among MEC and EDGEAPP systems, enhancing the overall performance of an Operator Platform.

20 Claims, 21 Drawing Sheets

(51) Int. Cl.
*H04L 41/50* (2022.01)
*H04W 4/50* (2018.01)

(56) References Cited

U.S. PATENT DOCUMENTS

| | | | | | |
|---|---|---|---|---|---|
| 12,184,739 | B2 * | 12/2024 | Sabella | H04L 12/1407 | |
| 12,302,275 | B2 * | 5/2025 | Sabella | G06F 9/45533 | |
| 2023/0145165 | A1 * | 5/2023 | Lee | H04L 67/133 | 709/203 |
| 2023/0229482 | A1 * | 7/2023 | Sinha | G06F 9/45558 | 718/1 |
| 2023/0229483 | A1 * | 7/2023 | Sinha | G06F 9/45558 | 718/1 |
| 2023/0229484 | A1 * | 7/2023 | Sinha | G06F 9/45533 | 718/1 |
| 2023/0362683 | A1 * | 11/2023 | Sabella | H04W 24/02 | |
| 2023/0370416 | A1 * | 11/2023 | Sabella | H04L 61/4511 | |
| 2024/0147404 | A1 * | 5/2024 | Sabella | G06F 9/45533 | |
| 2024/0195879 | A1 * | 6/2024 | Sabella | H04L 67/289 | |
| 2024/0320066 | A1 * | 9/2024 | Featherstone | G06F 9/542 | |
| 2024/0422616 | A1 * | 12/2024 | Pfadler | H04L 43/08 | |
| 2025/0097781 | A1 * | 3/2025 | Chen | H04W 36/0011 | |
| 2025/0286916 | A1 * | 9/2025 | Filippou | H04L 67/289 | |
| 2025/0310740 | A1 * | 10/2025 | Xu | H04L 67/51 | |
| 2025/0330935 | A1 * | 10/2025 | Sabella | H04M 15/66 | |

FOREIGN PATENT DOCUMENTS

| | | | | |
|---|---|---|---|---|
| CN | 119136264 | A * | 12/2024 | H04W 4/40 |
| DE | 112022004177 | T5 * | 8/2024 | H04L 67/51 |
| DE | 112022005251 | T5 * | 8/2024 | H04L 67/30 |
| EP | 4478780 | A1 * | 12/2024 | H04W 4/40 |
| EP | 4513141 | A1 * | 2/2025 | H04W 40/12 |
| EP | 4513854 | A1 * | 2/2025 | H04N 21/41422 |
| JP | 2021511737 | A * | 5/2021 | H04L 63/0853 |
| WO | WO-2020068238 | A1 * | 4/2020 | H04W 67/59 |
| WO | WO-2021062256 | A1 * | 4/2021 | H04L 67/59 |
| WO | WO-2022125456 | A1 * | 6/2022 | H04W 12/63 |
| WO | WO-2023003686 | A1 * | 1/2023 | H04M 15/66 |
| WO | WO-2023034392 | A1 * | 3/2023 | H04L 67/51 |
| WO | WO-2023081202 | A1 * | 5/2023 | H04L 67/30 |
| WO | WO-2024081317 | A1 * | 4/2024 | H04L 67/14 |
| WO | WO-2024108370 | A1 * | 5/2024 | H04W 4/50 |

OTHER PUBLICATIONS

"Multi-access Edge Computing (MEC); Study on Inter-MEC systems and MEC-Cloud systems coordination", ETSIGR MEC 035 V3.1.1, (Jun. 2021), 52 pgs.

"Harmonizing standards for edge computing—A synergized architecture leveraging ETSI ISG MEC and 3GPP specifications", ETSI White Paper #36 [Online]. Retrieved from the Internet: URL: https: www.etsi.org images files ETSIWhitePapers ETSI_wp36_Harmonizing-standards-for-edge-computing.pdf, (Jul. 2020), 14 pgs.

"GSMA Operator Platform Telco Edge Requirements 2022", [Online]. Retrieved from the Internet: URL: https: www.gsma.com futurenetworks resources gsma-operator-platform-telco-edge-requirements-2022 , (Apr. 21, 2022), 150 pgs.

"CAMARA: Telco Global API Alliance", [Online]. Retrieved from the Internet: URL: https: www.gsma.com futurenetworks ip_services understanding-5g camara-telco-global-api-alliance , (Accessed on Aug. 19, 2022), 5 pgs.

"Operator Platform API Group with 3GPP and ETSI | Workshop Recording", [Online]. Retrieved from the Internet: URL: https: www.gsma.com futurenetworks resources operator-platform-api-group-with-3gpp-etsi-workshop-recording , (Jan. 24, 2022), 4 pgs.

"3GPP TR 28.814 V17.0.0", 3rd Generation Partnership Project; Technical Specification Group Services and System Aspects;Management and orchestration;Study on enhancements of edge computing management(Release 17), (Sep. 2021), 7 pgs.

Sabella, Dario, "Edge Computing: from standard to actual infrastructure deployment and software development", Intel White Paper, (REvised Aug. 2021), 44 pgs.

* cited by examiner

OPERATOR PLATFORM INSTANCE FOR MEC FEDERATION TO SUPPORT NETWORK-AS-A-SERVICE

PRIORITY APPLICATION

This application claims the benefit of priority to Indian Application Serial Number 202241040528, filed Jul. 15, 2022, which is incorporated herein by reference in its entirety.

TECHNICAL FIELD

Embodiments described herein generally relate to data processing, network communication, and communication system implementations, and in particular, to techniques for federation in a multi-access edge computing (MEC) infrastructure.

BACKGROUND

Edge computing, at a general level, refers to the transition of compute and storage resources closer to endpoint devices (e.g., consumer computing devices, user equipment, etc.) to optimize total cost of ownership, reduce application latency, improve service capabilities, and improve compliance with security or data privacy requirements. Edge computing may, in some scenarios, provide a cloud-like distributed service that offers orchestration and management for applications among many types of storage and compute resources. As a result, some implementations of edge computing have been referred to as the "edge cloud" or the "fog", as powerful computing resources previously available only in large remote data centers are moved closer to endpoints and made available for use by consumers at the "edge" of the network.

Edge computing use cases in mobile network settings have been developed for integration with MEC approaches, initially known as "mobile edge computing," now known as "multi-access edge computing." MEC approaches are designed to allow application developers and content providers to access computing capabilities and an information technology (IT) service environment in dynamic mobile network settings at the edge of the network. Limited standards have been developed by the European Telecommunications Standards Institute (ETSI) industry specification group (ISG) in an attempt to define common interfaces for the operation of MEC systems, platforms, hosts, services, and applications.

Edge computing, MEC, and related technologies attempt to provide reduced latency, increased responsiveness, and more available computing power than offered in traditional cloud network services and wide area network connections. However, the integration of mobility and dynamically launched services to some mobile use and device processing use cases has led to limitations and concerns with orchestration, functional coordination, and resource management, especially in complex mobility settings where many participants (devices, hosts, tenants, service providers, operators) are involved.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

In the following description, methods, configurations, and related apparatuses are disclosed for supporting Network-as-a-Service functions in synergized edge deployments. In various examples, such edge deployments may include GSMA Operator Platform (OP) environments or ETSI MEC environments.

The following introduces an approach for aligning multiple standards for edge computing platform supporting MEC Federation, while considering a heterogeneous set of products in edge computing deployments. Furthermore, the steps identified for the architectural implementation of OP instances enable multiple kinds of applications, e.g., LCM (Life-Cycle-Management) which is operated either by ETSI MEC Management & Orchestration (MANO), or by a 3GPP management system, or by a third party (proprietary or open source) LCM system or orchestrator.

Hence, the following approaches start from (1) defining an OP instance deployment in synergized ETSI/3GPP systems, then (2) performing a mapping of OP roles into existing standards and functional entities (e.g., from ETSI and 3GPP), and (3) identifying an evolutionary path of architectural elements in current standards and functional entities for full OP support.

Accordingly, for the purpose of identifying the architectural elements, following proposes multiple implementations:

Implementation 1—A MEC-based edge application instance LCM (depicted in FIG. 7, and discussed in more detail below).

Implementation 2—Two standalone LCM systems (depicted in FIG. 8, and discussed in more detail below).

Implementation 3—A single, synergized edge application instance LCM system (depicted in FIG. 9, and discussed in more detail below).

Figure 10:
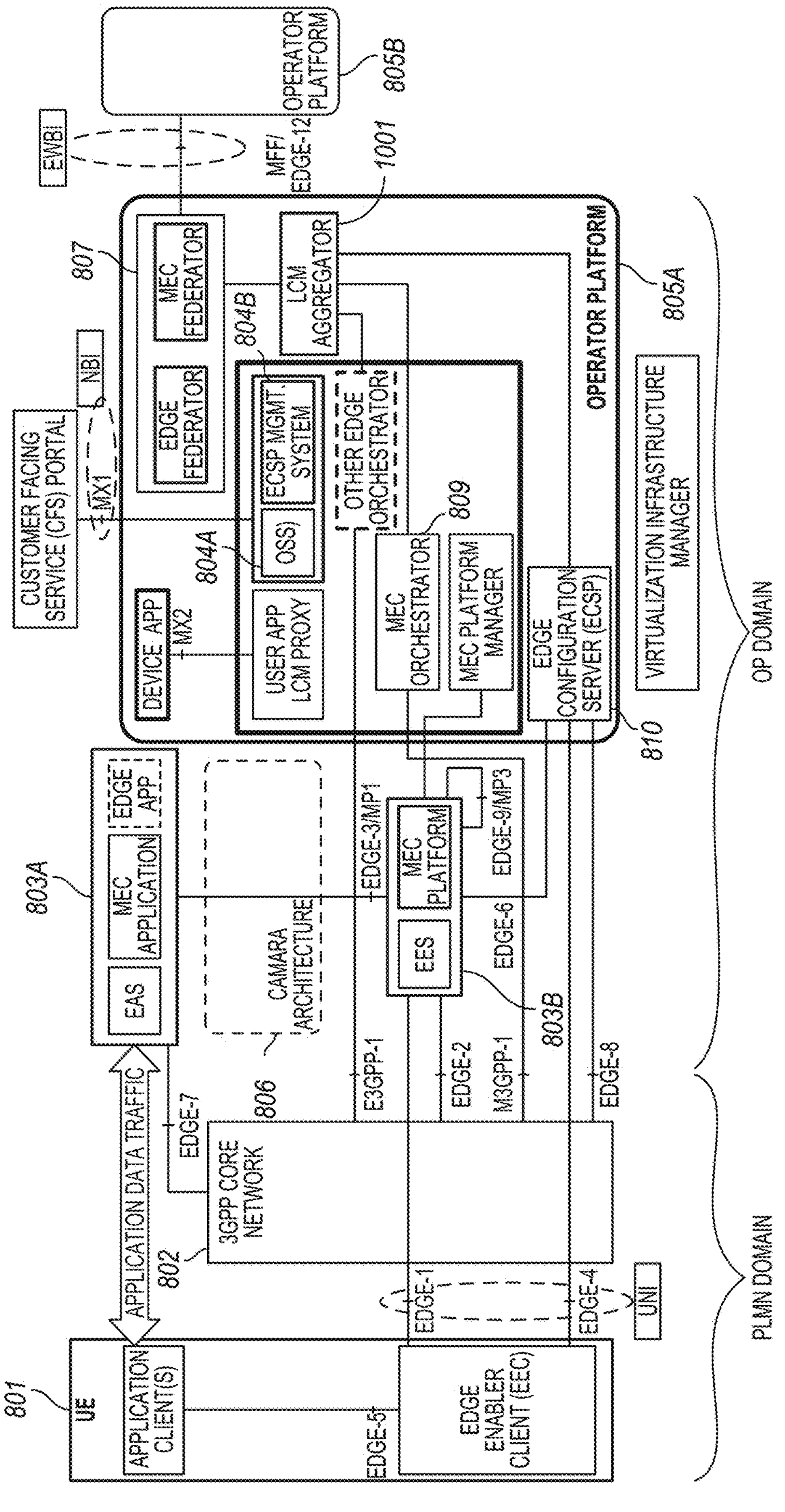

Implementation 4—Two LCM systems with an LCM Aggregator (depicted in FIG. 10, and discussed in more detail below).

Implementation 5—A MEC-based app LCM, with OP as single AF (depicted in FIG. 11, and discussed in more detail below).

Accordingly, such implementations enable solutions to technical problems encountered from aligning multiple standards. The detailed implementations, as may be understood, may provide a base for future standardization work in ETSI MEC and 3GPP. For example, the present implementations may have an impact on 3GPP (e.g., TR 23.958, TS 23.558) and ETSI standards (e.g., MEC 011, MEC 040, MEC 003), for defining messages and data types related to the envisaged architectural enhancements.

As detailed below, the following allows a convergence of 3GPP EDGEAPP and ETSI MEC system architecture, with benefits for operators and service providers in terms of lowering costs for edge computing deployments. More specifically, the identified solutions allow use of third party/proprietary LCM of edge applications. This may allow the use of additional third party LCM components and entities. A variety of technical and operational benefits may be provided from these deployments.

Example MEC Architectures

Figure 1A:
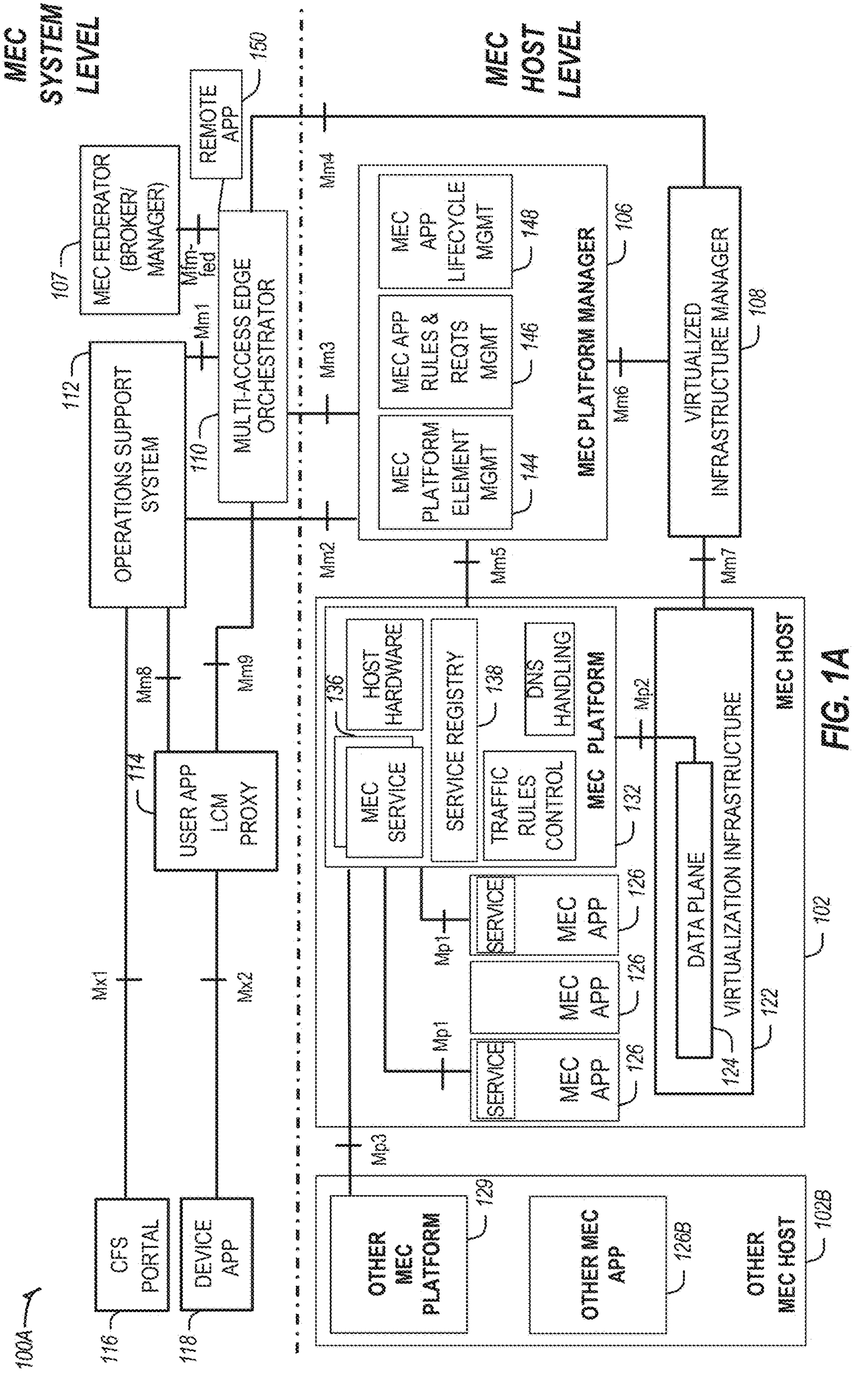
FIG. 1A illustrates a MEC system reference architecture, according to an example.

FIG. 1A illustrates a MEC system reference architecture (or MEC architecture) 100A providing functionalities in accordance with ETSI GS MEC 003 v2.1.1 (2019 January) ("[MEC003]"); ETSI GS MEC 009 V2.1.1 (2019 January) ("[MEC009]"); ETSI GS MEC 010-1 V1.1.1 (2017 October) ("[MEC010-1]"); ETSI GS MEC 010-2 V2.1.1 (2019 November) ("[MEC010-2]"); ETSI GS MEC 011 V1.1.1 (2017 July) ("[MEC011]"); ETSI GS MEC 012 V2.1.1 (2019 December) ("[MEC012]"); ETSI GS MEC 013 v2.1.1 (2019 September) ("[MEC013]"); ETSI GS MEC 014 V1.1.1 (2018 February) ("[MEC014]"); ETSI GS MEC 015 v2.1.1 (2020 June) ("[MEC015]"); ETSI GS MEC 028 v2.1.1 (2020 July) ("[MEC028]"); ETSI GS MEC 029 v2.1.1 (2019 July) ("[MEC029]"); ETSI MEC GS 030 v2.1.1 (2020 April) ("[MEC030]"); ETSI GR MEC 035 V3.1.1 (2021 June) ("[MEC035]"); ETSI GS MEC 040 ("[MEC040]"); among many other ETSI MEC standards. MEC offers application developers and content providers cloud-computing capabilities and an IT service environment at the edge of the network. This environment is characterized by ultra-low latency and high bandwidth as well as real-time access to radio network information that can be leveraged by applications. MEC technology permits to flexible and rapid deployment of innovative applications and services towards mobile subscribers, enterprises and vertical segments. In particular, regarding the automotive sector, applications such as V2X need to exchange data, provide data to aggregation points and access to data in databases which provide an overview of the local situation derived from a multitude of sensors (by various cars, roadside units, etc.).

The MEC architecture 100A includes MEC hosts 102, a virtualization infrastructure manager (VIM) 108, an MEC platform manager 106, an MEC orchestrator 110, an operations support system (OSS) 112, a user app proxy 114, a UE app 118 running on UE (not shown), and CFS portal 116. The MEC host 102 can include a MEC platform 132 with filtering rules control component, a DNS handling component, a service registry 138, and MEC services 136. The MEC services 136 can include at least one scheduler, which can be used to select resources for instantiating MEC apps (or NFVs) 126 upon virtualization infrastructure (VI) 122. The MEC apps 126 can be configured to provide services 130, which can include processing network communications traffic of different types associated with one or more wireless connections (e.g., connections to one or more RANs or core network functions) and/or some other services such as those discussed herein. The other MEC host 102B may have a same or similar configuration/implementation as the MEC host 102, and the other MEC app 126B instantiated within other MEC host 102 can be similar to the MEC apps 126 instantiated within MEC host 102. The VI 122 includes a data plane 124 coupled to the MEC platform 132 via an Mp2 interface. Additional interfaces between various network entities of the MEC architecture 100A are illustrated in FIG. 1A.

The MEC system includes three groups of reference points, including "Mp" reference points regarding the MEC platform functionality; "Mm" reference points, which are management reference points; and "Mx" reference points, which connect MEC entities to external entities. The interfaces/reference points in the MEC system may include IP-based connections, and may be used to provide Representational State Transfer (REST or RESTful) services, and the messages conveyed using the reference points/interfaces may be in XML, HTML, JSON, or some other desired format, such as those discussed herein. A suitable Authentication, Authorization, and Accounting (AAA) protocol, such as the radius or diameter protocols, may also be used for communicating over the reference points/interfaces.

The logical connections between various entities of the MEC architecture 100A may be access-agnostic and not dependent on a particular deployment. MEC enables implementation of MEC apps 126 as software-only entities that run on top of a VI 122, which is located in or close to the network edge. A MEC app 126 is an application that can be instantiated on a MEC host 102 within the MEC system and can potentially provide or consume MEC services 136.

The MEC entities depicted by FIG. 1A can be grouped into a MEC system level, MEC host level, and network level entities (not shown). The network level (not shown) includes various external network level entities, such as a 3GPP network, a local area network (e.g., a LAN, WLAN, PAN, DN, LADN, etc.), and external network(s). The MEC system level includes MEC system level management entities and UE(s), and is discussed in more detail below. The MEC host level includes one or more MEC hosts 102, 102B and MEC management entities, which provide functionality to run MEC Apps 126, 126B within an operator network or a subset of an operator network. The MEC management entities include various components that handle the management of the MEC-specific functionality of a particular MEC platform 132, MEC host 102, and the MEC Apps 126 to be run.

The MEC platform manager 106 is a MEC management entity including MEC platform element management component 144, MEC app rules and requirements management component 146, and MEC app lifecycle management component 148. The various entities within the MEC architecture 100A can perform functionalities as discussed in [MEC003]. The remote app 150 is configured to communicate with the MEC host 102 (e.g., with the MEC apps 126) via the MEC orchestrator 110 and the MEC platform manager 106.

The MEC host 102 is an entity that contains an MEC platform 132 and VI 122 which provides compute, storage, and network resources for the purpose of running MEC Apps 126. The VI 122 includes a data plane (DP) 124 that executes traffic rules 140 received by the MEC platform 132, and routes the traffic among MEC Apps 126, MEC services 136, DNS server/proxy (see e.g., via DNS handling entity which provides the DNS rules 142), 3GPP network, local networks, and external networks. The MEC DP 124 may be connected with the (R)AN nodes and the 3GPP core network, and/or may be connected with an access point via a wider network, such as the internet, an enterprise network, or the like.

The MEC platform 132 is a collection of essential functionality required to run MEC Apps 126 on a particular VI 122 and enable them to provide and consume MEC services 136, and that can provide itself a number of MEC services 136. The MEC platform 132 can also provide various services and/or functions, such as offering an environment where the MEC Apps 126 can discover, advertise, consume and offer MEC services 136 (discussed in more detail below), including MEC services 136 available via other platforms when supported. The MEC platform 132 may be able to allow authorized MEC Apps 126 to communicate with third party servers located in external networks. The MEC platform 132 may receive traffic rules from the MEC platform manager 106, applications, or services, and instruct the data plane accordingly (see e.g., traffic rules 140). The MEC platform 132 may send instructions to the DP 124 within the VI 122 via the Mp2 reference point. The Mp2 reference point between the MEC platform 132 and the DP 124 of the VI 122 may be used to instruct the DP 124 on how to route traffic among applications, networks, services, etc. The MEC platform 132 may translate tokens representing UEs in the traffic rules into specific IP addresses. The MEC platform 132 also receives DNS records from the MEC platform manager 106 and configures a DNS proxy/server accordingly. The MEC platform 132 hosts MEC services 136 including the multi-access edge services discussed infra, and provide access to persistent storage and time of day information. Furthermore, the MEC platform 132 may communicate with other MEC platforms 129 of other MEC hosts/servers via the Mp3 reference point.

The VI 122 represents the totality of all hardware and software components which build up the environment in which MEC Apps 126 and/or MEC platform 132 are deployed, managed and executed. The VI 122 may span across several locations, and the network providing connectivity between these locations is regarded to be part of the VI 122. The physical hardware resources of the VI 122 includes computing, storage and network resources that provide processing, storage and connectivity to MEC Apps 126 and/or MEC platform 132 through a virtualization layer (e.g., a hypervisor, VM monitor (VMM), or the like). The virtualization layer may abstract and/or logically partition the physical hardware resources of a MEC server in MEC host 102 as a hardware abstraction layer. The virtualization layer may also enable the software that implements the MEC Apps 126 and/or MEC platform 132 to use the underlying VI 122, and may provide virtualized resources to the MEC Apps 126 and/or MEC platform 132, so that the MEC Apps 126 and/or MEC platform 132 can be executed.

The MEC Apps 126 are applications that can be instantiated on a MEC host 102 (e.g., server) within the MEC system and can potentially provide or consume MEC services 136. The term "MEC service" refers to a service provided via a MEC platform 132 either by the MEC platform 132 itself or by a MEC App 126. MEC Apps 126 may run as a VM on top of the VI 122 provided by the MEC host 102, and can interact with the MEC platform 132 to consume and provide the MEC services 136. The Mp1 reference point between the MEC platform 132 and the MEC Apps 126 is used for consuming and providing service specific functionality. Mp1 provides service registration 138, service discovery, and communication support for various services, such as the MEC services 136 provided by MEC host 102. Mp1 may also provide application availability, session state relocation support procedures, traffic rules and DNS rules activation, access to persistent storage and time of day information, and/or the like.

The MEC Apps 126 are instantiated on the VI 122 of the MEC host 102 based on configuration or requests validated by the MEC management (e.g., MEC platform manager 106). The MEC Apps 126 can also interact with the MEC platform 132 to perform certain support procedures related to the lifecycle of the MEC Apps 126, such as indicating availability, preparing relocation of user state, etc. The MEC Apps 126 may have a certain number of rules and requirements associated to them, such as required resources, maximum latency, required or useful services, etc. These requirements may be validated by the MEC management, and can be assigned to default values if missing. MEC services 136 are services provided and/or consumed either by the MEC platform 132 and/or MEC Apps 126. The service consumers (e.g., MEC Apps 126 and/or MEC platform 132) may communicate with particular MEC services 136 over individual APIs (including the various MEC APIs discussed herein). When provided by an application, a MEC service 136 can be registered in a list of services in the service registries 138 to the MEC platform 132 over the Mp1 reference point. Additionally, a MEC App 126 can subscribe to one or more services 130/136 for which it is authorized over the Mp1 reference point.

Communication between applications and services in the MEC server is designed according to the principles of Service-oriented Architecture (SOA). The communication services allow applications hosted on a single MEC server to communicate with the application-platform services through well-defined APIs and with each other through a service-specific API. The service registry 138 provides visibility of the services available on the MEC host 102. The service registry 138 uses the concept of loose coupling of services, providing flexibility in application deployment. In addition, the service registry presents service availability (status of the service) together with the related interfaces and versions. It is used by applications to discover and locate the endpoints for the services they require, and to publish their own service endpoint for other applications to use. The access to the service registry 138 is controlled (authenticated and authorized). Additionally or alternatively, for the communication services, a lightweight broker-based 'publish and subscribe' messaging protocol is used. The 'publish and subscribe' capability provides one-to-many message distribution and application decoupling. Subscription and publishing by applications are access controlled (authenticated and authorized). The messaging transport should be agnostic to the content of the payload. Mechanisms should be provided to protect against malicious or misbehaving applications.

Examples of MEC services 136 include the V2X Information Service (VIS), Radio Network Information Service (RNIS) [MEC012], Location Service (LS) [MEC013], UE_ID Services [MEC014], BandWidth Management Service (BWMS) [MEC015], WLAN Access Information Service (WAIS) [MEC028], Fixed Access Information Service (FAIS) [MEC029], and/or other MEC services. The RNIS, when available, provides authorized MEC Apps 126 with radio network related information (RNI), and expose appropriate up-to-date radio network information to the MEC Apps 126. The RNI may include, inter alia, radio network conditions, measurement and statistics information related to the user plane, information related to UEs served by the radio node(s) associated with the MEC host 102 (e.g., UE context and radio access bearers), changes on information related to UEs served by the radio node(s) associated with the MEC host 102, and/or the like. The RNI may be provided at the relevant granularity (e.g., per UE, per cell, per period of time).

The service consumers (e.g., MEC Apps 126, MEC platform 132, etc.) may communicate with the RNIS over an RNI API to obtain contextual information from a corresponding RAN. RNI may be provided to the service consumers via a NAN (e.g., (R)AN node, remote radio head (RRH), access point (AP), etc.). The RNI API may support both query and subscription (e.g., a pub/sub) based mechanisms that are used over a Representational State Transfer (RESTful) API or over a message broker of the MEC platform 132 (not shown). A MEC App 126 may query information on a message broker via a transport information query procedure, wherein the transport information may be pre-provisioned to the MEC App 126 via a suitable configuration mechanism. The various messages communicated via the RNI API may be in XML, JSON, Protobuf, or some other suitable format.

The VIS provides supports various V2X applications. The RNI may be used by MEC Apps 126 and MEC platform 132 to optimize the existing services and to provide new types of services that are based on up to date information on radio conditions. As an example, a MEC App 126 may use RNI to optimize current services such as video throughput guidance. In throughput guidance, a radio analytics MEC App 126 may use MEC services to provide a backend video server with a near real-time indication on the throughput estimated to be available at the radio DL interface in a next time instant. The throughput guidance radio analytics application computes throughput guidance based on the required radio network information it obtains from a multi-access edge service running on the MEC host 102. RNI may be also used by the MEC platform 132 to optimize the mobility procedures required to support service continuity, such as when a certain MEC App 126 requests a single piece of information using a simple request-response model (e.g., using RESTful mechanisms) while other MEC Apps 126 subscribe to multiple different notifications regarding information changes (e.g., using a pub/sub mechanism and/or message broker mechanisms).

The LS, when available, may provide authorized MEC Apps 126 with location-related information, and expose such information to the MEC Apps 126. With location related information, the MEC platform 132 or one or more MEC Apps 126 perform active device location tracking, location-based service recommendations, and/or other like services. The LS supports the location retrieval mechanism, e.g., the location is reported only once for each location information request. The LS supports a location subscribe mechanism, for example, the location is able to be reported multiple times for each location request, periodically or based on specific events, such as location change. The location information may include, inter alia, the location of specific UEs currently served by the radio node(s) associated with the MEC host 102, information about the location of all UEs currently served by the radio node(s) associated with the MEC server 136, information about the location of a certain category of UEs currently served by the radio node(s) associated with the MEC server 136, a list of UEs in a particular location, information about the location of all radio nodes currently associated with the MEC host 102, and/or the like. The location information may be in the form of a geolocation, a Global Navigation Satellite Service (GNSS) coordinate, a Cell identity (ID), and/or the like. The LS is accessible through the API defined in the Open Mobile Alliance (OMA) specification "RESTful Network API for Zonal Presence" OMA-TS-REST-NetAPI-ZonalPresence-V1-0-20160308-C. The Zonal Presence service utilizes the concept of "zone", where a zone lends itself to be used to group all radio nodes that are associated to a MEC host 102, or a subset thereof, according to a desired deployment. In this regard, the OMA Zonal Presence API provides means for MEC Apps 126 to retrieve information about a zone, the access points associated to the zones and the users that are connected to the access points. In addition, the OMA Zonal Presence API, allows authorized application to subscribe to a notification mechanism, reporting about user activities within a zone. A MEC host 102 may access location information or zonal presence information of individual UEs using the OMA Zonal Presence API to identify the relative location or positions of the UEs.

The Traffic Management Service (TMS) allows edge applications to get informed of various traffic management capabilities and multi-access network connection information, and allows edge applications to provide requirements, e.g., delay, throughput, loss, for influencing traffic management operations. In some implementations, the TMS includes Multi-Access Traffic Steering (MTS), which seamlessly performs steering, splitting, and duplication of application data traffic across multiple access network connections. The BWMS provides for the allocation of bandwidth to certain traffic routed to and from MEC Apps 126, and specify static/dynamic up/down bandwidth resources, including bandwidth size and bandwidth priority. MEC Apps 126 may use the BWMS to update/receive bandwidth information to/from the MEC platform 132. Different MEC Apps 126 running in parallel on the same MEC host 102 may be allocated specific static, dynamic up/down bandwidth resources, including bandwidth size and bandwidth priority. The BWMS includes a bandwidth management (BWM) API to allowed registered applications to statically and/or dynamically register for specific bandwidth allocations per session/application. The BWM API includes HTTP protocol bindings for BWM functionality using RESTful services or some other suitable API mechanism.

The purpose of the UE Identity feature is to allow UE specific traffic rules in the MEC system. When the MEC system supports the UE Identity feature, the MEC platform 132 provides the functionality (e.g., UE Identity API) for a MEC App 126 to register a tag representing a UE or a list of tags representing respective UEs. Each tag is mapped into a specific UE in the MNO's system, and the MEC platform 132 is provided with the mapping information. The UE Identity tag registration triggers the MEC platform 132 to activate the corresponding traffic rule(s) 140 linked to the tag. The MEC platform 132 also provides the functionality (e.g., UE Identity API) for a MEC App 126 to invoke a de-registration procedure to disable or otherwise stop using the traffic rule for that user.

The WAIS is a service that provides WLAN access related information to service consumers within the MEC System. The WAIS is available for authorized MEC Apps 126 and is discovered over the Mp1 reference point. The granularity of the WLAN Access Information may be adjusted based on parameters such as information per station, per NAN/AP, or per multiple APs (Multi-AP). The WLAN Access Information may be used by the service consumers to optimize the existing services and to provide new types of services that are based on up-to-date information from WLAN APs, possibly combined with the information such as RNI or Fixed Access Network Information. The WAIS defines protocols, data models, and interfaces in the form of RESTful APIs. Information about the APs and client stations can be requested either by querying or by subscribing to notifications, each of which include attribute-based filtering and attribute selectors.

The FAIS is a service that provides Fixed Access Network Information (or FAI) to service consumers within the MEC System. The FAIS is available for the authorized MEC Apps 126 and is discovered over the Mp1 reference point. The FAI may be used by MEC Apps 126 and the MEC platform 132 to optimize the existing services and to provide new types of services that are based on up-to-date information from the fixed access (e.g., NANs), possibly combined with other information such as RNI or WLAN Information from other access technologies. Service consumers interact with the FAIS over the FAI API to obtain contextual information from the fixed access network. Both the MEC Apps 126 and the MEC platform 132 may consume the FAIS; and both the MEC platform 132 and the MEC Apps 126 may be the providers of the FAI. The FAI API supports both queries and subscriptions (pub/sub mechanism) that are used over the RESTful API or over alternative transports such as a message bus. Alternative transports may also be used.

The MEC management comprises MEC system level management and MEC host level management. The MEC management comprises the MEC platform manager 106 and the VI manager (VIM) 108, and handles the management of MEC-specific functionality of a particular MEC host 102 (server) and the applications running on it. In some implementations, some or all of the multi-access edge management components may be implemented by one or more servers located in one or more data centers, and may use virtualization infrastructure that is connected with NFV infrastructure used to virtualize NFs, or using the same hardware as the NFV infrastructure.

The MEC platform manager 106 is responsible for managing the life cycle of applications including informing the MEC orchestrator (MEC-O) 110 of relevant application related events. The MEC platform manager 106 may also provide MEC Platform Element management functions 144 to the MEC platform 132, manage MEC App rules and requirements 146 including service authorizations, traffic rules, DNS configuration and resolving conflicts, and manage MEC App lifecycle management 148. The MEC platform manager 106 may also receive virtualized resources, fault reports, and performance measurements from the VIM 108 for further processing. The Mm5 reference point between the MEC platform manager 106 and the MEC platform 132 is used to perform platform configuration, configuration of the MEC Platform element management 144, MEC App rules and requirements 146, MEC App lifecycle management 148, and management of application relocation.

The VIM 108 may be an entity that allocates, manages and releases virtualized (compute, storage and networking) resources of the VI 122, and prepares the VI 122 to run a software image. To do so, the VIM 108 may communicate with the VI 122 over the Mm7 reference point between the VIM 108 and the VI 122. Preparing the VI 122 may include configuring the VI 122, and receiving/storing the software image. When supported, the VIM 108 may provide rapid provisioning of applications, such as described in "Openstack++ for Cloudlet Deployments", available at http://reports-archive.adm.cs.cmu.edu/anon/2015/CMU-CS-15-123.pdf. The VIM 108 may also collect and report performance and fault information about the virtualized resources, and perform application relocation when supported. For application relocation from/to external cloud environments, the VIM 108 may interact with an external cloud manager to perform the application relocation, for example using the mechanism described in "Adaptive VM Handoff Across Cloudlets", and/or possibly through a proxy. Furthermore, the VIM 108 may communicate with the MEC platform manager 106 via the Mm6 reference point, which may be used to manage virtualized resources, for example, to realize the application lifecycle management. Moreover, the VIM 108 may communicate with the MEC-O 110 via the Mm4 reference point, which may be used to manage virtualized resources of the MEC host 102, and to manage application images. Managing the virtualized resources may include tracking available resource capacity, etc.

The MEC system level management includes the MEC-O 110, which has an overview of the complete MEC system. The MEC-O 110 may maintain an overall view of the MEC system based on deployed MEC hosts 102, available resources, available MEC services 136, and topology. The Mm3 reference point between the MEC-O 110 and the MEC platform manager 106 may be used for the management of the application lifecycle, application rules and requirements and keeping track of available MEC services 136. The MEC-O 110 may communicate with the user application lifecycle management proxy (UALMP) 114 via the Mm9 reference point in order to manage MEC Apps 126 requested by UE app 118.

The MEC-O 110 may also be responsible for on-boarding of application packages, including checking the integrity and authenticity of the packages, validating application rules and requirements and if necessary adjusting them to comply with operator policies, keeping a record of on-boarded packages, and preparing the VIM(s) 108 to handle the applications. The MEC-O 110 may select appropriate MEC host(s) for application instantiation based on constraints, such as latency, available resources, and available services. The MEC-O 110 may also trigger application instantiation and termination, as well as trigger application relocation as needed and when supported.

The Operations Support System (OSS) 112 is the OSS of an operator that receives requests via the Customer Facing Service (CFS) portal 116 over the Mx1 reference point and from UE apps 118 for instantiation or termination of MEC Apps 126. The OSS 112 decides on the granting of these requests. The CFS portal 116 (and the Mx1 interface) may be used by third-parties to request the MEC system to run apps 118 in the MEC system. Granted requests may be forwarded to the MEC-O 110 for further processing. When supported, the OSS 112 also receives requests from UE apps 118 for relocating applications between external clouds and the MEC system. The Mm2 reference point between the OSS 112 and the MEC platform manager 106 is used for the MEC platform manager 106 configuration, fault and performance management. The Mm1 reference point between the MEC-O 110 and the OSS 112 is used for triggering the instantiation and the termination of MEC Apps 126 in the MEC system.

The UE app(s) 118 (also referred to as "device applications" or the like) is one or more apps running in a device that has the capability to interact with the MEC system via the user application lifecycle management proxy 114. The UE app(s) 118 may be, include, or interact with one or more client applications, which in the context of MEC, is application software running on the device that utilizes functionality provided by one or more specific MEC Apps 126. The user app LCM proxy 114 may authorize requests from UE apps 118 in the UE and interacts with the OSS 112 and the MEC-O 110 for further processing of these requests. The term "lifecycle management," in the context of MEC, refers to a set of functions required to manage the instantiation, maintenance and termination of a MEC App 126 instance. The user app LCM proxy 114 may interact with the OSS 112 via the Mm8 reference point, and is used to handle UE App 118 requests for running applications in the MEC system. A user app may be an MEC App 126 that is instantiated in the MEC system in response to a request of a user via an application running in the UE (e.g., UE App 118). The user app LCM proxy 114 allows UE apps 118 to request on-boarding, instantiation, termination of user applications and when supported, relocation of user applications in and out of the MEC system. It also allows informing the user apps about the state of the user apps. The user app LCM proxy 114 is only accessible from within the mobile network, and may only be available when supported by the MEC system. A UE app 118 may use the Mx2 reference point between the user app LCM proxy 114 and the UE app 118 to request the MEC system to run an application in the MEC system, or to move an application in or out of the MEC system. The Mx2 reference point may only be accessible within the mobile network and may only be available when supported by the MEC system.

In order to run an MEC App 126 in the MEC system, the MEC-O 110 receives requests triggered by the OSS 112, a third-party, or a UE app 118. In response to receipt of such requests, the MEC-O 110 selects a MEC host 102 (server) to host the MEC App 126 for computational offloading, etc. These requests may include information about the application to be run, and possibly other information, such as the location where the application needs to be active, other application rules and requirements, as well as the location of the application image if it is not yet on-boarded in the MEC system.

The MEC-O 110 may select one or more MEC hosts 102 (servers) for computationally intensive tasks. The selected one or more MEC hosts may offload computational tasks of a UE app 118 based on various operational parameters, such as network capabilities and conditions, computational capabilities and conditions, application requirements, and/or other like operational parameters. The application requirements may be rules and requirements associated to/with one or more MEC Apps 126, such as deployment model of the application (e.g., whether it is one instance per user, one instance per host, one instance on each host, etc.); required virtualized resources (e.g., compute, storage, network resources, including specific hardware support); latency requirements (e.g., maximum latency, how strict the latency constraints are, latency fairness between users); requirements on location; multi-access edge services that are required and/or useful for the MEC Apps 126 to be able to run; multi-access edge services that the MEC Apps 126 can take advantage of, if available; connectivity or mobility support/requirements (e.g., application state relocation, application instance relocation); required multi-access edge features, such as VM relocation support or UE identity; required network connectivity (e.g., connectivity to applications within the MEC system, connectivity to local networks, or to the Internet); information on the operator's MEC system deployment or mobile network deployment (e.g., topology, cost); requirements on access to user traffic; requirements on persistent storage; traffic rules 140; DNS rules 142; etc.

The MEC-O 110 considers the requirements and information listed above and information on the resources currently available in the MEC system to select one or several MEC hosts 102 (servers) to host MEC Apps 126 and/or for computational offloading. After one or more MEC services 136 are selected, the MEC-O 110 requests the selected MEC host(s) 102 to instantiate the application(s) or application tasks. The actual algorithm used to select the MEC hosts 102 depends on the implementation, configuration, and/or operator deployment. The selection algorithm(s) may be based on the task offloading criteria/parameters, for example, by taking into account network, computational, and energy consumption requirements for performing application tasks, as well as network functionalities, processing, and offloading coding/encodings, or differentiating traffic between various RATs. Under certain circumstances (e.g., UE mobility events resulting in increased latency, load balancing decisions, etc.), and if supported, the MEC-O 110 may decide to select one or more new MEC hosts 102 to act as a master node, and initiates the transfer of an application instance or application-related state information from the one or more source MEC hosts 102 to the one or more target MEC hosts 102.

Additionally or alternatively, MEC system can be flexibly deployed depending on the use case/vertical segment/information to be processed. Some components of the MEC system can be co-located with other elements of the system. As an example, in certain use cases (e.g., enterprise), a MEC app 126 may need to consume a MEC service locally, and it may be efficient to deploy a MEC host locally equipped with the needed set of APIs. In another example, deploying a MEC host 102 in a data center (which can be away from the access network) may not need to host some APIs like the RNI API (which can be used for gathering radio network information from the radio base station). On the other hand, RNI information can be elaborated and made available in the cloud RAN (CRAN) environments at the aggregation point, thus enabling the execution of suitable radio-aware traffic management algorithms. In some other aspects, a bandwidth management API may be present both at the access level edge and also in more remote edge locations, in order to set up transport networks (e.g., for CDN-based services).

Additionally, FIG. 1A illustrates a MEC system reference architecture variant for MEC federation. Here, this shows a single MEC Federation functional entity, namely, a MEC Federator 107 (providing the roles of a MEC Federation Manager (MEFM) and a MEC Federation Broker (MEFB)), and the Mfm-fed interface/reference point connecting the Federator 107 to the MEO 110. The federator may be divided into separate entities in some examples.

Figure 1B:
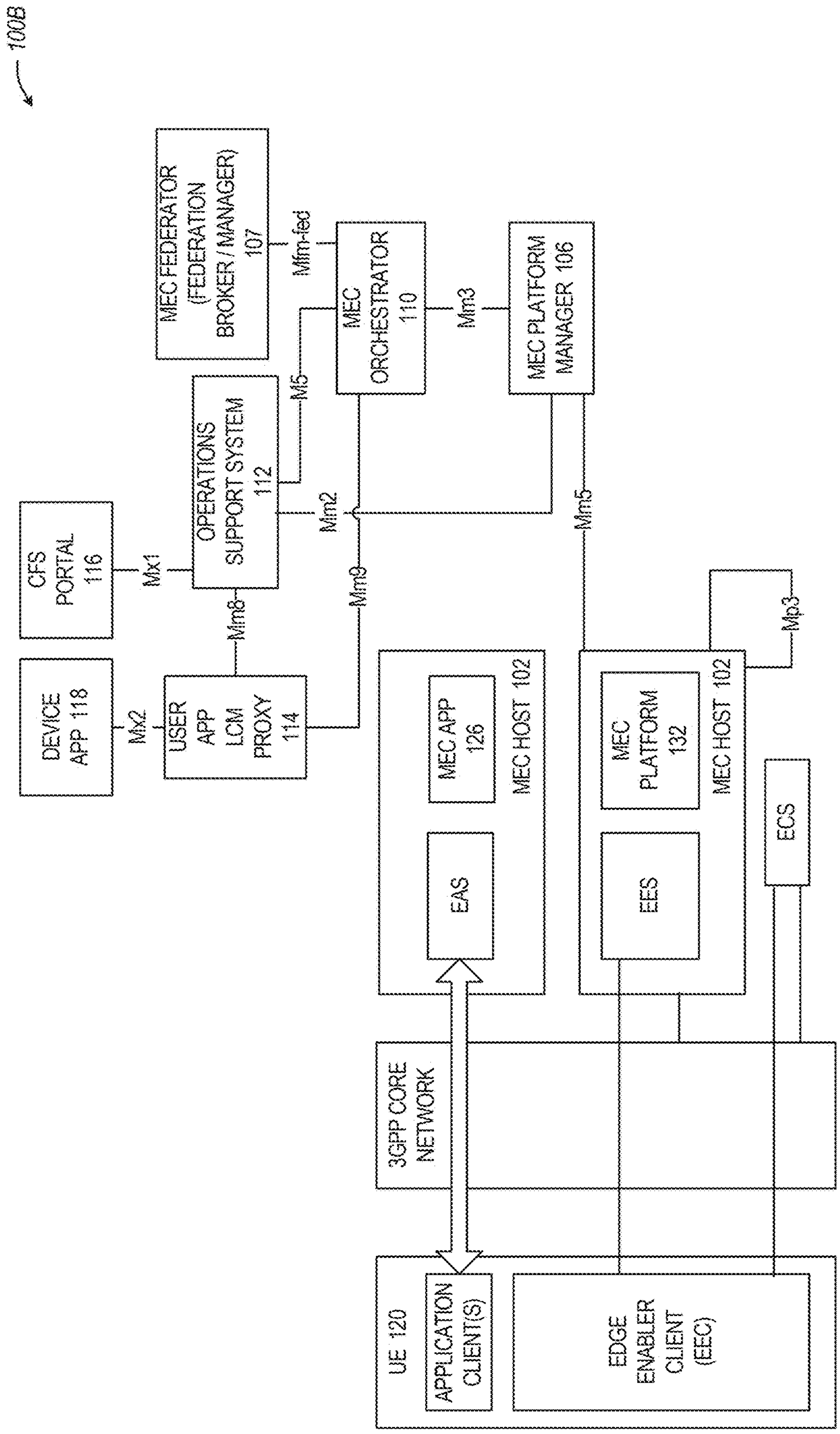
FIG. 1B illustrates an adaptation of the MEC system reference architecture for supporting different modes of operations, according to an example.

FIG. 1B illustrates a Synergized MEC architecture 100B supporting different modes of operations and leveraging 3GPP (SA6 EDGEAPP) and ETSI ISG MEC (see e.g., ETSI White Paper #36, "Harmonizing standards for edge computing—A synergized architecture leveraging ETSI ISG MEC and 3GPP specification", 1st Ed., ISBN No. 979-10-92620-35-5 (July 2020) ("[ETSIWP36]")). FIG. 1B further illustrates an adaptation of such synergized architecture, taking into account the MEC Federation variant of the reference MEC architecture and the 3GPP EDGEAPP architecture such as specified in 3GPP TS 23.558 v17.0.0 (2021 Jun. 28) ("[TS23558]").

On the left side of FIG. 1B, devices (e.g., UE 120) run application clients which either use the DNS to discover application servers (Edge Application Server (EAS) in 3GPP SA6 terminology or MEC Application in ETSI ISG MEC terminology) or use the Edge Enabler Client (EEC) to perform the discovery according to the SA6 EDGEAPP architecture.

Towards the middle of FIG. 1B, a platform (Edge Enabler Server (EES) in 3GPP SA6 and MEC Platform in ETSI ISG MEC) provide functionality pertaining to mediating access to network services, application authorization, application's service registration and application's service discovery, context transfer, etc. A given implementation can combine functions specified by ETSI ISG MEC and ones specified by 3GPP SA6. The platform typically exposes APIs towards edge cloud applications (MEC application or Edge Application Server). EDGE-3 and Mp1 offer complementary API functions, therefore can be considered to be part of a single reference point from an application developer perspective. Towards the right of FIG. 1B, functionalities specified by ETSI ISG MEC include management and orchestration of the MEC platforms and OSS functions supporting access to portals offered to application service providers.

EDGE-3 and Mp1 provide service registration and service discovery features which allow an edge cloud application to register services exposed by this application and their subsequent discovery and use by other applications. The exposed services can be about network services, subject to their availability at the core or access network level. The common capabilities may be harmonized through adoption of the Common API Framework (CAPIF) such as specified in 3GPP TS 23.222 v17.5.0 (2021 Jun. 24) ("[TS23222]"). EDGE-9 and Mp3 are both at early stage of development. Both are intended to assist in context migration. The following interfaces are about simple endorsement of SA2 interfaces (e.g., Network Exposure Function/Service Capability Exposure Function, NEF/SCEF): EDGE-2, EDGE-7, EDGE-8, M3GPP-1. According to 3GPP SA6 specification, edge services are exposed to the application clients by the Edge Configuration Server (ECS) and Edge Enabler Server (EES) via the Edge Enabler Client (EEC) in the UE. Each EEC is configured with the address of the ECS, which is provided by either the MNO or by the Edge Computing Service Provider. Deployment options discussed in ETSI White Paper #36, "Harmonizing standards for edge computing—A synergized architecture leveraging ETSI ISG MEC and 3GPP specifications", July 2020, may implement all or a subset of the features of the synergized architecture as shown in subsequent sections.

Figure 1C:
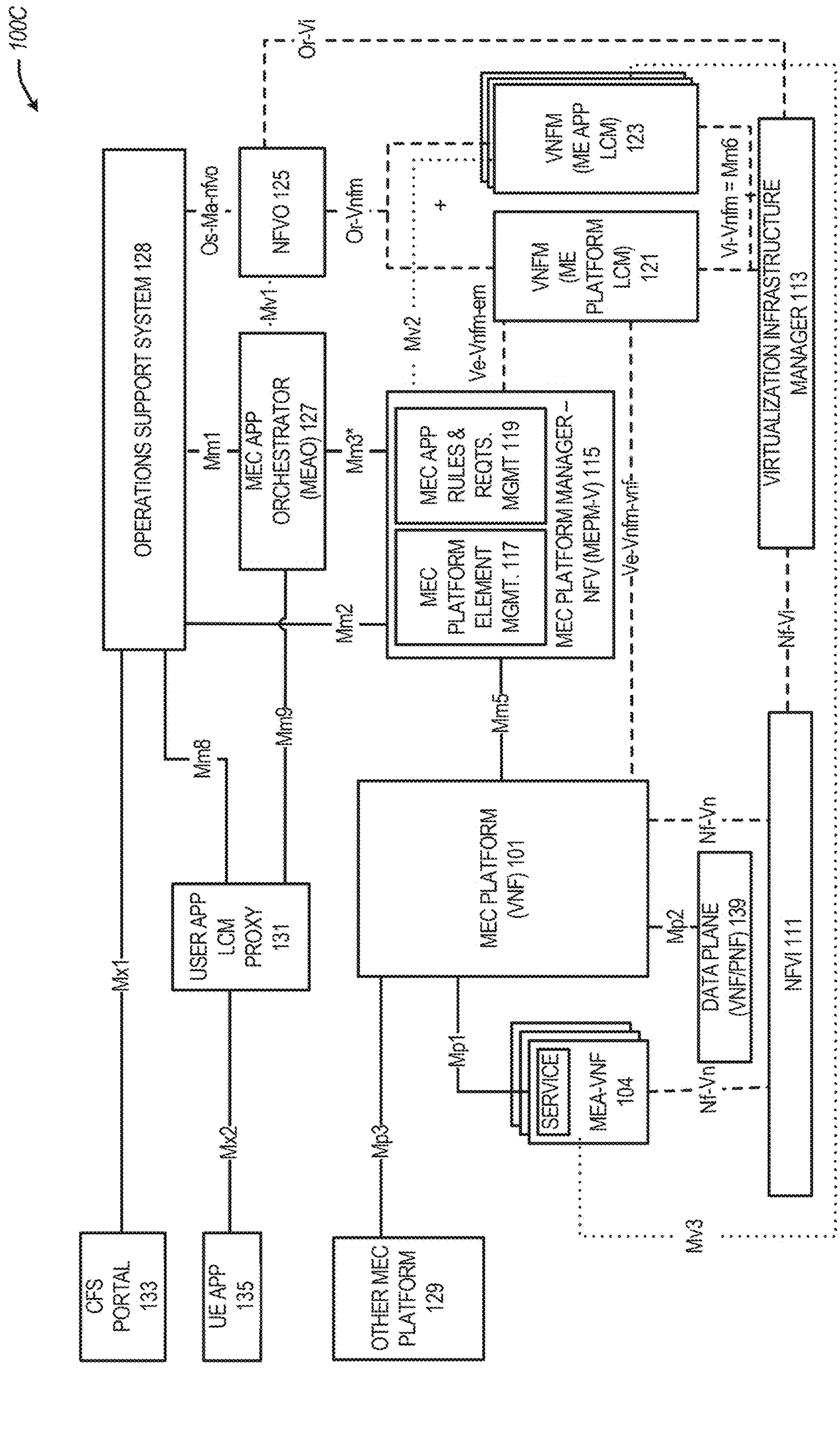
FIG. 1C illustrates a MEC reference architecture in a NFV environment, according to an example.

FIG. 1C illustrates a MEC reference architecture 100C in a NFV environment. The MEC architecture 100C includes a MEC platform 101, a MEC platform manager—NFV (MEPM-V) 115, a data plane 139, a NFV infrastructure (NFVI) 110, VNF managers (VNFMs) 121 and 123, NFV orchestrator (NFVO) 125, a MEC app orchestrator (MEAO) 127, an OSS 128, a user app LCM proxy 131, a UE app 135, and a CFS portal 133. The MEC platform manager 115 can include a MEC platform element management 117 and MEC app rules and requirements management 119. The MEC platform 101 can be coupled to another MEC platform 129 via an Mp3 interface.

The MEC platform 101 is deployed as a VNF. The MEC applications 104 can appear like VNFs towards the ETSI NFV Management and Orchestration (MANO) components. This allows re-use of ETSI NFV MANO functionality. The full set of MANO functionality may be unused and certain additional functionality may be needed. Such a specific MEC app is denoted by the name "MEC app VNF" or "MEA-VNF". The virtualization infrastructure is deployed as an NFVI 111 and its virtualized resources are managed by the virtualized infrastructure manager (VIM) 113. For that purpose, one or more of the procedures defined by ETSI NFV Infrastructure specifications can be used (see e.g., ETSI GS NFV-INF 003 V2.4.1 (2018 February), ETSI GS NFV-INF 004 V2.4.1 (2018 February), ETSI GS NFV-INF 005 V3.2.1 (2019 April), and ETSI GS NFV-IFA 009 V1.1.1 (2016 July) (collectively "[ETSI-NFV]")). The MEA-VNF 104 are managed like individual VNFs, allowing that a MEC-in-NFV deployment can delegate certain orchestration and LCM tasks to the NFVO 125 and VNFMs 121 and 123, as defined by ETSI NFV MANO.

When a MEC platform is implemented as a VNF (e.g., MEC platform VNF 101), the MEPM-V 115 may be configured to function as an Element Manager (EM). The MEAO 127 uses the NFVO 125 for resource orchestration, and for orchestration of the set of MEA-VNFs 104 as one or more NFV Network Services (NSs). The MEPM-V 115 delegates the LCM part to one or more VNFMs 121 and 123. A specific or generic VNFM 121, 123 is/are used to perform LCM. The MEPM-V 115 and the VNFM (ME platform LCM) 121 can be deployed as a single package as per the ensemble concept in 3GPP TR 32.842 v13.1.0 (2015 Dec. 21) ("[TR32842]"), or that the VNFM is a Generic VNFM as per [ETSI-NFV] and the MEC Platform VNF 101 and the MEPM-V 115 are provided by a single vendor.

The Mp1 reference point between a MEC app 104 and the MEC platform 115 can be optional for the MEC app 104, unless it is an application that provides and/or consumes a MEC service. The Mm3* reference point between MEAO 127 and the MEPM-V 115 is based on the Mm3 reference point (see e.g., [MEC003]). Changes may be configured to this reference point to cater for the split between MEPM-V 115 and VNFM (ME applications LCM) 123. The following new reference points (Mv1, Mv2, and Mv3) are introduced between elements of the ETSI MEC architecture and the ETSI NFV architecture to support the management of MEC app VNFs 104.

The following reference points are related to existing NFV reference points, but only a subset of the functionality may be used for ETSI MEC, and extensions may be necessary. Mv1 is a reference point connecting the MEAO 127 and the NFVO 125, and is related to the Os-Ma-nfvo reference point as defined in ETSI NFV). Mv2 is a reference point connecting the VNFM 123 that performs the LCM of the MEC app VNFs 104 with the MEPM-V 115 to allow LCM related notifications to be exchanged between these entities. Mv2 is related to the Ve-Vnfm-em reference point as defined in ETSI NFV, but may possibly include additions, and might not use all functionality offered by the Ve-Vnfm-em. Mv3 is a reference point connecting the VNFM 123 with the MEC app VNF 104 instance to allow the exchange of messages (e.g., related to MEC app LCM or initial deployment-specific configuration). Mv3 is related to the Ve- Vnfm-vnf reference point, as defined in ETSI NFV, but may include additions, and might not use all functionality offered by Ve-Vnfm-vnf.

The following reference points are used as they are defined by ETSI NFV: Nf-Vn reference point connects each MEC app VNF 104 with the NFVI 111. The Nf-Vi reference point connects the NFVI 111 and the VIM 113. The Os-Ma-nfvo reference point connects the OSS 128 and the NFVO 125 and is primarily used to manage NSs (e.g., a number of VNFs connected and orchestrated to deliver a service). The Or-Vnfm reference point connects the NFVO 125 and the VNFM (MEC Platform LCM) 121 and is primarily used for the NFVO 125 to invoke VNF LCM operations. Vi-Vnfm reference point connects the VIM 113 and the VNFM (MEC Platform LCM) 121 and is primarily used by the VNFM 121 to invoke resource management operations to manage cloud resources that are needed by the VNF (it is assumed in an NFV-based MEC deployment that this reference point corresponds 1:1 to M5). The Or-Vi reference point connects the NFVO 125 and the VIM 113 and is primarily used by the NFVO 125 to manage cloud resources capacity. The Ve-Vnfm-em reference point connects the VNFM (MEC Platform LCM) 121 with the MEPM-V 115. The Ve-Vnfm-vnf reference point connects the VNFM (MEC Platform LCM) 121 with the MEC Platform VNF 101.

Figure 2:
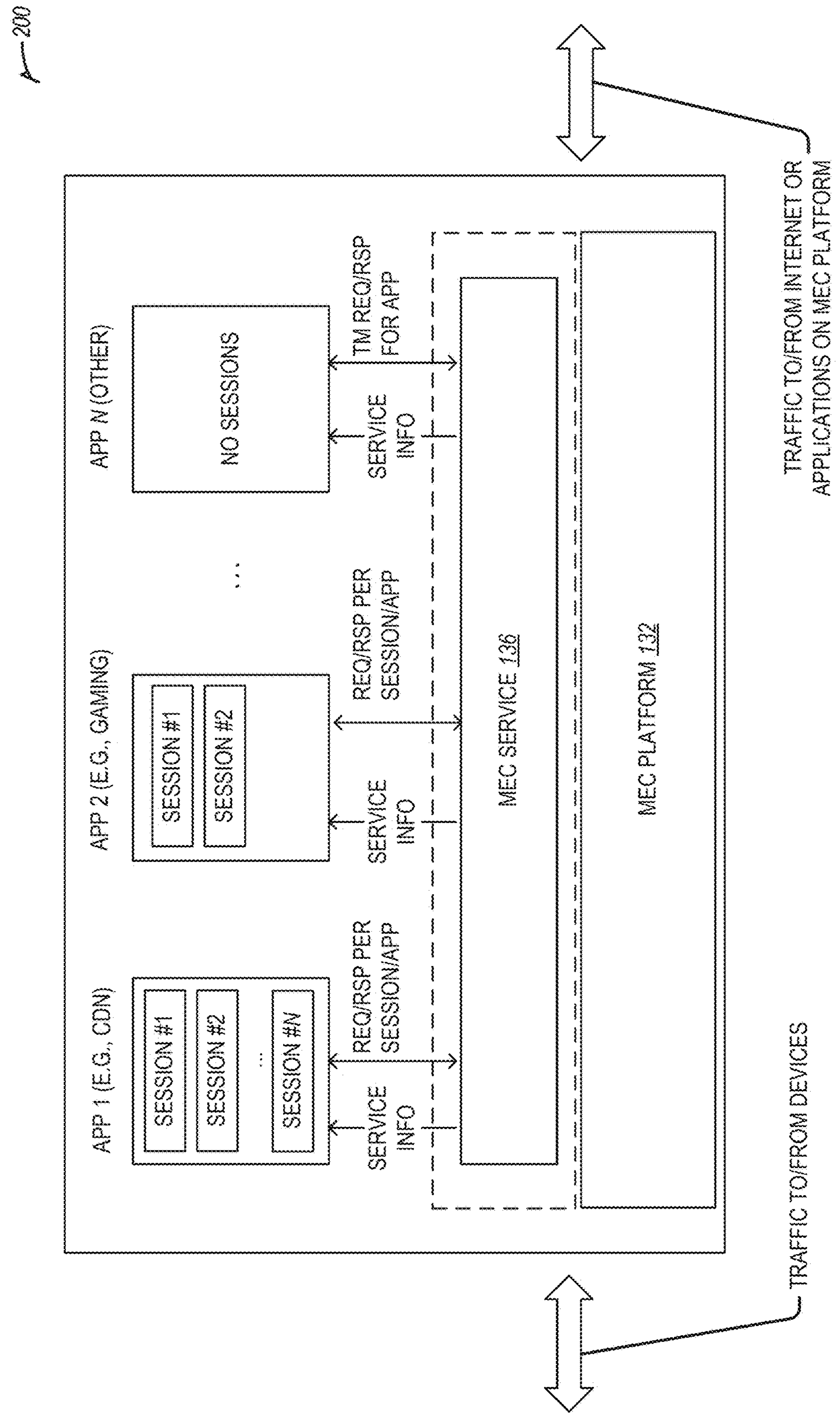
FIG. 2 illustrates an example MEC service architecture, according to an example.

FIG. 2 illustrates an example MEC service architecture 200. MEC service architecture 200 includes the MEC service 136, MEC platform 132 (e.g., corresponding to MEC platform 132), and applications (Apps) 1 to N (where N is a number). As an example, the App 1 may be a CDN app/service hosting 1 to n sessions (where n is a number that is the same or different than N), App 2 may be a gaming app/service which is shown as hosting two sessions, and App N may be some other app/service which is shown as a single instance (e.g., not hosting any sessions). Each App may be a distributed application that partitions tasks and/or workloads between resource providers (e.g., servers such as MEC platform 132) and consumers (e.g., UEs, user apps instantiated by individual UEs, other servers/services, network functions, application functions, etc.). Each session represents an interactive information exchange between two or more elements, such as a client-side app and its corresponding server-side app, a user app instantiated by a UE and a MEC app instantiated by the MEC platform 132, and/or the like. A session may begin when App execution is started or initiated and ends when the App exits or terminates execution. Additionally or alternatively, a session may begin when a connection is established and may end when the connection is terminated. Each App session may correspond to a currently running App instance. Additionally or alternatively, each session may correspond to a Protocol Data Unit (PDU) session or multi-access (MA) PDU session. A PDU session is an association between a UE 120 and a DN that provides a PDU connectivity service, which is a service that provides for the exchange of PDUs between a UE 120 and a Data Network. An MA PDU session is a PDU Session that provides a PDU connectivity service, which can use one access network at a time, or simultaneously a 3GPP access network and a non-3GPP access network. Furthermore, each session may be associated with a session identifier (ID) which is data the uniquely identifies a session, and each App (or App instance) may be associated with an App ID (or App instance ID) which is data the uniquely identifies an App (or App instance).

The MEC service 136 provides one or more MEC services to MEC service consumers (e.g., Apps 1 to N). The MEC service 136 may optionally run as part of the platform (e.g., MEC platform 132) or as an application (e.g., MEC app). Different Apps 1 to N, whether managing a single instance or several sessions (e.g., CDN), may request specific service info per their requirements for the whole application instance or different requirements per session. The MEC service 136 may aggregate all the requests and act in a manner that will help optimize the BW usage and improve Quality of Experience (QoE) for applications.

The MEC service 136 provides a MEC service API that supports both queries and subscriptions (e.g., pub/sub mechanism) that are used over a Representational State Transfer ("REST" or "RESTful") API or over alternative transports such as a message bus. For RESTful architectural style, the MEC APIs contain the HTTP protocol bindings for traffic management functionality.

Each Hypertext Transfer Protocol (HTTP) message is either a request or a response. A server listens on a connection for a request, parses each message received, interprets the message semantics in relation to the identified request target, and responds to that request with one or more response messages. A client constructs request messages to communicate specific intentions, examines received responses to see if the intentions were carried out, and determines how to interpret the results. The target of an HTTP request is called a "resource." Additionally or alternatively, a "resource" is an object with a type, associated data, a set of methods that operate on it, and relationships to other resources if applicable. Each resource is identified by at least one Uniform Resource Identifier (URI), and a resource URI identifies at most one resource. Resources are acted upon by the RESTful API using HTTP methods (e.g., POST, GET, PUT, DELETE, etc.). With every HTTP method, one resource URI is passed in the request to address one particular resource. Operations on resources affect the state of the corresponding managed entities.

Considering that a resource could be anything, and that the uniform interface provided by HTTP is similar to a window through which one can observe and act upon such a thing only through the communication of messages to some independent actor on the other side, an abstraction is needed to represent ("take the place of") the current or desired state of that thing in our communications. That abstraction is called a representation. For the purposes of HTTP, a "representation" is information that is intended to reflect a past, current, or desired state of a given resource, in a format that can be readily communicated via the protocol. A representation comprises a set of representation metadata and a potentially unbounded stream of representation data. Additionally or alternatively, a resource representation is a serialization of a resource state in a particular content format.

An origin server might be provided with, or be capable of generating, multiple representations that are each intended to reflect the current state of a target resource. In such cases, some algorithm is used by the origin server to select one of those representations as most applicable to a given request, usually based on content negotiation. This "selected representation" is used to provide the data and metadata for evaluating conditional requests constructing the payload for response messages (e.g., 200 OK, 304 Not Modified responses to GET, and the like). A resource representation is included in the payload body of an HTTP request or response message. Whether a representation is required or not allowed in a request depends on the HTTP method used (see, e.g., IETF RFC 7231 (June 2014)).

The MEC API resource Universal Resource Indicators (URIs) are discussed in various ETSI MEC standards, such as those mentioned herein. The MTS API supports additional application-related error information to be provided in the HTTP response when an error occurs (see e.g., clause 6.15 of [MEC009]). The syntax of each resource URI follows [MEC009], as well as Berners-Lee et al., "Uniform Resource Identifier (URI): Generic Syntax", IETF Network Working Group, RFC 3986 (January 2005) and/or Nottingham, "URI Design and Ownership", IETF RFC 8820 (June 2020). In the RESTful MEC service APIs, including the VIS API, the resource URI structure for each API has the following structure:

{apiRoot}/{apiName}/{apiVersion}/{apiSpecificSuffixes}

Here, "apiRoot" includes the scheme ("https"), host and optional port, and an optional prefix string. The "apiName" defines the name of the API (e.g., MTS API, RNI API, etc.). The "apiVersion" represents the version of the API, and the "apiSpecificSuffixes" define the tree of resource URIs in a particular API. The combination of "apiRoot", "apiName" and "apiVersion" is called the root URI. The "apiRoot" is under control of the deployment, whereas the remaining parts of the URI are under control of the API specification. In the above root, "apiRoot" and "apiName" are discovered using the service registry (see e.g., service registry 138 in FIG. 1A). It includes the scheme ("http" or "https"), host and optional port, and an optional prefix string. For the a given MEC API, the "apiName" may be set to "mec" and "apiVersion" may be set to a suitable version number (e.g., "v1" for version 1). The MEC APIs support HTTP over TLS (also known as HTTPS). All resource URIs in the MEC API procedures are defined relative to the above root URI.

The JSON content format may also be supported. The JSON format is signaled by the content type "application/json". The MTS API may use the OAuth 2.0 client credentials grant type with bearer tokens (see e.g., [MEC009]). The token endpoint can be discovered as part of the service availability query procedure defined in [MEC009]. The client credentials may be provisioned into the MEC app using known provisioning mechanisms.

Technical Problems in MEC Federation and Operator Platform Environments

In the context of a deployed system (such as the MEC system depicted in FIGS. 1A-2, the edge computing systems depicted in FIGS. 12-15, or like variations of distributed computing architectures) the present techniques and configurations provide the capability for application coordination, registration, management, and information exchange, among other functions.

As context for the following discussion, according to ETSI GR MEC 035 V3.1.1 (2021 June) ("[MEC035]"), a Multi-access Edge Computing (MEC) federation is a federated model of MEC systems enabling shared usage of MEC services and applications. This definition is based on standardized solutions to address the Operator Platform (OP) Telco Edge requirements discussed in GSMA OPG Permanent Reference Document (PRD), "Operator Platform Telco Edge Requirements", GSMA Assoc., Official Document OPG.02, version 1 (29 Jun. 2021) ("[OPG02]"). The concept of the Operator Platform (OP) developed by GSMA OPG (which is composed of over 40 of the world's largest operators and over 25 ecosystem partners) is that edge compute from operators should be federated and exposed in the same fashion to create a multi-domain capability that could be presented to customers/developers. Moreover, the exploitation of the edge can be enhanced by utilizing network resources (e.g., device location, user plane control, mobility, etc.).

Figure 3:
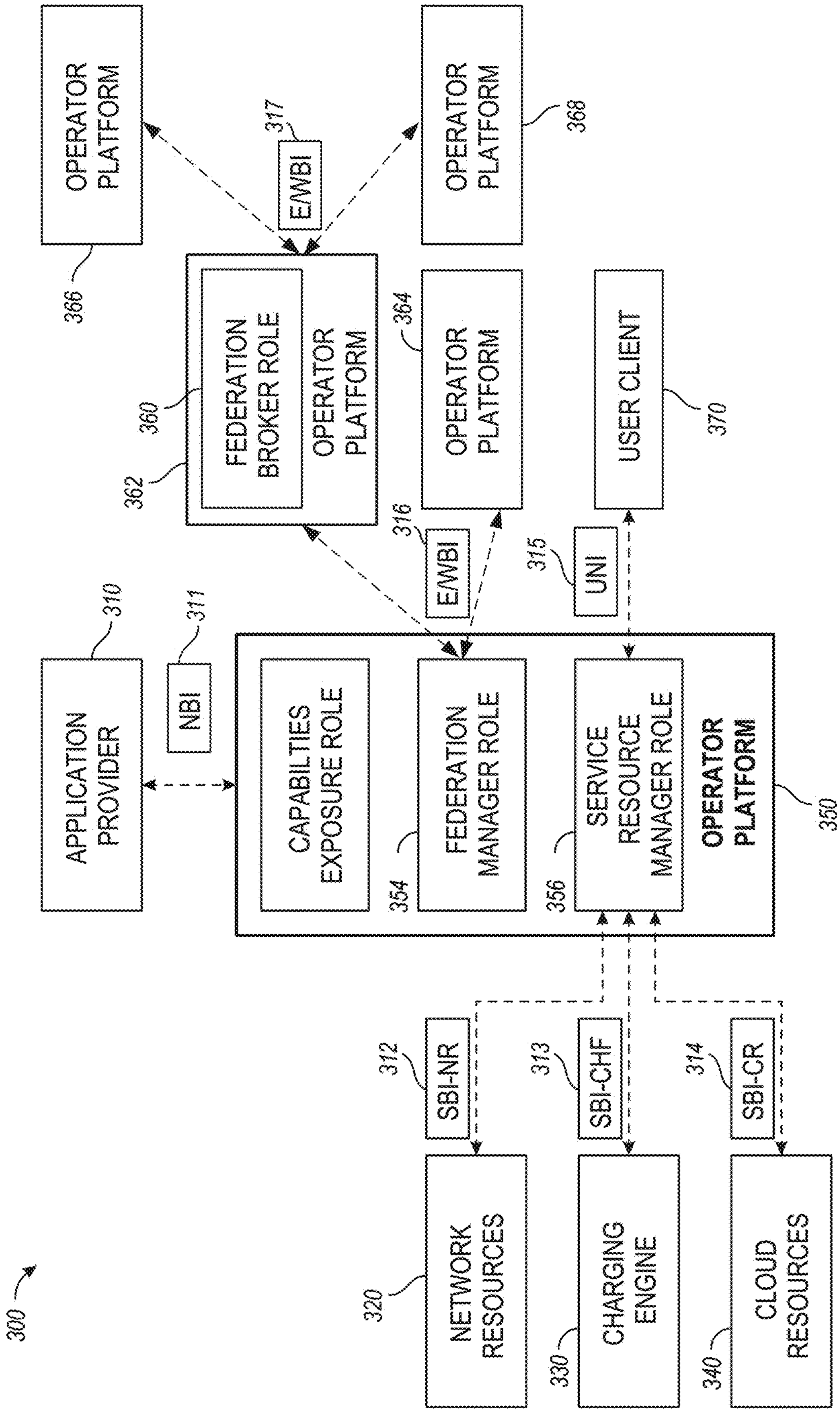
FIG. 3 depicts an Operator Platform (OP) Roles and Interfaces Reference Architecture, according to an example.

FIG. 3 depicts an OP Roles and Interfaces Reference Architecture 300. According to [OPG02], an Operator Platform (OP) is a facilitator of subscribers' seamless access to edge applications instantiated within a federation of edge networks involving multiple owners. Such seamless access is needed either when subscribers roam to visited networks or when a partner network is a better choice for edge application instantiation. The objective of the OP concept is to guide the industry ecosystem (e.g., mobile network operators (MNOs), vendors, OEMs and service providers) towards shaping a common solution for the exposure of network capabilities. As an initial step, [OPG02] provides both an end-to-end definition and requirements of the OP for the support of edge computing. In further details, the GSMA defines OP requirements as well as OP architecture and functional modules. Therefore, an aim of GSMA is to engage with standardization and open source communities that will undertake the standard definition of the OP.

As depicted in FIG. 3, the following OP interfaces have been defined according to the principles set forth in [OPG02]:

- Northbound Interface (NBI) 311 (e.g., providing an interface between an application provider 310 and an operator platform 350);
- Southbound Interface (SBI)—Cloud Resources (SBI-CR) 314 (e.g., providing a connection between cloud resources 340 and the service resource manager role 356 of the operator platform 350);
- Southbound Interface (SBI)—Network Resources (SBI-NR) 312 (e.g., providing a connection between network resources 320 and the service resource manager role 356 of the operator platform 350);
- Southbound Interface (SBI)—Charging Functions (SBI-CHF) 313 (e.g., providing a connection between a charging engine 330 and the service resource manager role 356 of the operator platform 350);
- User Network Interface (UNI) 315 (e.g., providing a connection between a user client 370 and the service resource manager role 356 of the operator platform 350); and
- East/West Bound Interface (E/WBI) 316, 317 (e.g., providing a connection between an operator platform 362, 364 and the federation manager role 354 of operator platform 350, including the operator platform 362 that includes a federation broker role 360; or, a connection between operator platform 362 and operator platforms 366, 368).

In particular, the NBI 311 connecting an application provider 310 to an OP instance (e.g., operator platform 350) and the E/WBIs 316, 317 connecting two OP instances (e.g., two of operator platforms 350, 352, 364, 366, 368) are aimed to be standardized by ETSI MEC. This mapping can extend beyond reference point correspondences, and to take requirements into account from GSMA OPG (and requirements from SDOs) to further elaborate on reference architectures as standalone systems.

Proposed Standards Development Organization (SDO) mapping for an OP, using the synergized architecture supported by ETSI MEC and 3GPP EDGEAPP [e.g., as described in OPG-WS-22], has proposed three deployment options: 1) a product compliant with ETSI MEC only; 2) a product compliant with 3GPP only; 3) a product compliant with both systems. With current specifications, it is not possible to cover the OPG requirements of the OP architecture with a single SDO only. Thus, SDOs are in need of adaptation to support the OP requirements, both to support the first two options (i.e. standalone ETSI or 3GPP compliances) as well as a product compliant with both systems. Such an adaptation is provided with the use of a synergized OP architecture, discussed in more detail below.

In this context, Network-as-a-Service (NaaS) enables a network operator to make network capabilities available for external consumption, including monitoring and configuration related capabilities, through Application Programming Interfaces (APIs). This functionality is not currently available with the exception of approaches that share edge cloud infrastructure resources to other network operators that are members of a federation. The need to expose telco capabilities to third party apps was first conceived in 3GPP, with the definition of Service Capability Exposure Function (SCEF, Rel-13) and Network Exposure Function (NEF, Rel-15). However, SCEF/NEF scope is limited to expose capabilities from the core network. The need from developer perspective is, instead, to consume a heterogeneous set of APIs, such as: 1) Other network domain APIs; 2) Cloud domain APIs (e.g. Kubernetes); 3) IT domain APIs, e.g., by 3GPP, ETSI MEC and TMF.

It will be understood that these approaches and systems may be integrated or combined with the architecture of the CAMARA open source project, which is in collaboration with the GSMA OP Group. The CAMARA open source project specifically introduces an Exposure Gateway that allows the interaction between the API provider and consumer, especially when both the two entities belong to non-trusted domains. The Common API Framework (CAPIF) introduced by 3GPP can be used as Exposure Gateway solution for any API, regardless of internal API semantics, (e.g., offering an abstraction level that can be comprehended by the application developer/industry vertical/third party service provider). CAPIF is typically considered the reference solution for Exposure Gateway in CAMARA.

As a consequence, the following problem has been provided. By referring to the OP architecture defined by GSMA OPG, (captured in GSMA OP PRD v2.0 [e.g., GSMA Operator Platform Telco Edge Requirements 2022, April 2022]), the following addresses an interoperability problem that arises from federating OP instances: multiple systems can have different edge computing platforms and related orchestrators, while a single and common interface should be standardized to define the OP-NBI. Thus, for a federation of OPs, the following addresses what extensions to the current standard architectures are required, so that the lifecycle of an edge application instance of any kind can be managed in a heterogeneous OP federation environment Below, various approaches are proposed for solving the complex problem of aligning multiple standards, while considering a heterogeneous set of products in edge computing deployments. Furthermore, the evolutionary steps identified for the architectural implementation of OP are openly allowing multiple kinds of applications (e.g., LCM (Life-Cycle-Management)) of which is operated either by ETSI MEC Management & Orchestration (MANO), or by 3GPP management system, or also a third party (proprietary or open source) LCM system or orchestrator.

The following embodiments are based on the current standards in ETSI MEC and 3GPP, and provide an evolutionary migration of current standard elements by leveraging the synergized architecture supported by these standard bodies [e.g., as specified in ETSI-WP-36]. It will be understood that the following approaches may also be adapted for other standards and architectures.

Applicability to Operator Platform and MEC Frameworks

Figure 4:
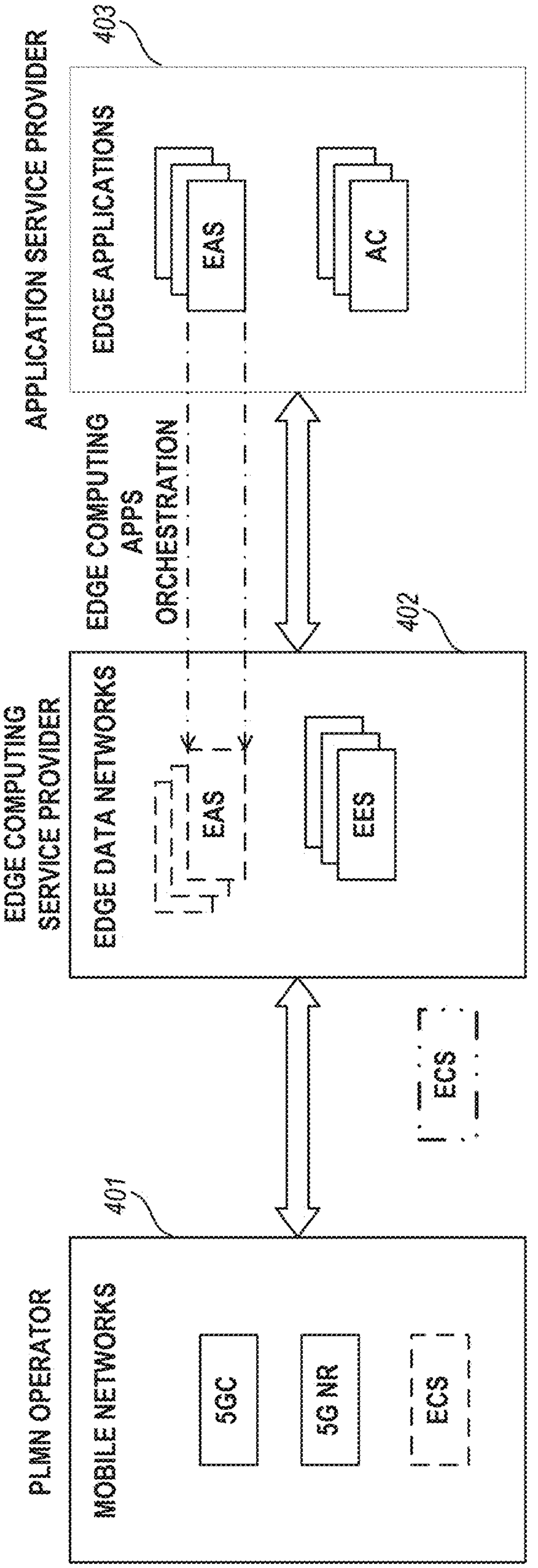
FIG. 4 depicts relationships between operator and service providers on mobile networks, according to an example.

The domain of the Operator Platform is commonly separated from the network domain (e.g., 4G vs 5G networks). This view is also coherent with ETSI MEC and 3GPP. In fact, MEC (seen by 5GS as an AF) is often portrayed as being located outside the 3GPP domain. For example, FIG. 4 depicts that according to 3GPP [e.g., TR-28.814] the 5GC is in the PLMN domain of mobile networks 401, while 3GPP EDGEAPP entities like Edge Enabler Server (EES) (e.g., hosted at an edge computing service provider 402) and Edge Application Server (EAS) (e.g., hosted by an application service provider 403) are outside this domain.

Even in GSMA OPG [e.g., GSMA Operator Platform Telco Edge Requirements 2022, April 2022] settings, the OP can be seen by 5GS as an AF. In such contexts, the following provides implementations of an OP instance in synergized ETSI/3GPP systems, which will satisfy the GSMA requirements for MEC Federation.

In particular, by referring to the OP architecture defined by GSMA OPG (e.g., captured in GSMA OP PRD v2.0 [GSMA Operator Platform Telco Edge Requirements 2022, April 2022]), an interoperability problem arises from federating OP instances: multiple systems can have different edge computing platforms and related orchestrators, while a single and common interface should be standardized to define the OP-NBI. Thus, for a federation of OPs, a question is raised of what extensions to the current standard architectures are required so that the lifecycle of an edge application instance of any kind can be managed in such a heterogeneous OP federation environment.

Figure 5:
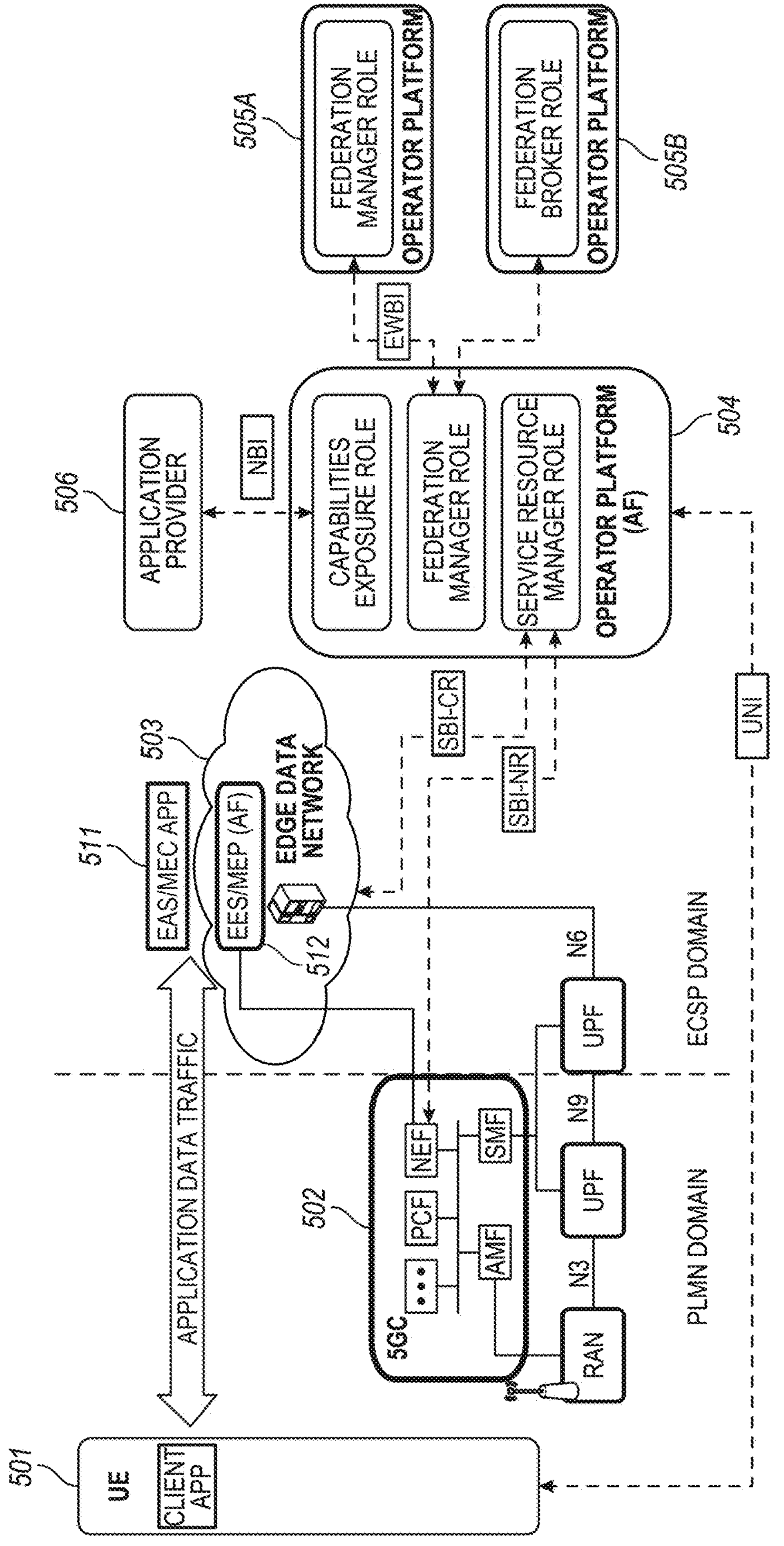
FIG. 5 depicts coordination of OP instance deployments in synergized ETSI/3GPP systems, according to an example.

In a first approach, depicted in FIG. 5, OP instance deployments are identified in synergized ETSI/3GPP systems. This deployment includes a UE 501 connected to a 5G core 502 and an edge computing platform 503 hosting an EAS or MEC app 511. This deployment identifies the OP instance 504 as an AF outside the PLMN trust domain (indicated in FIG. 5 as an Edge Cloud Service Provider domain or "ECSP domain"), and connected with the edge computing platform 503. Here, the EES/MEP 512 is also considered as either two separate AFs or as a single AF, to support the applications provided at the EAS/MEC app 511. The OP instance 504 is connected to an application provider 506 via a NBI and connected to a federation manager 505A and federation broker 505B via EWBIs.

Figure 6:
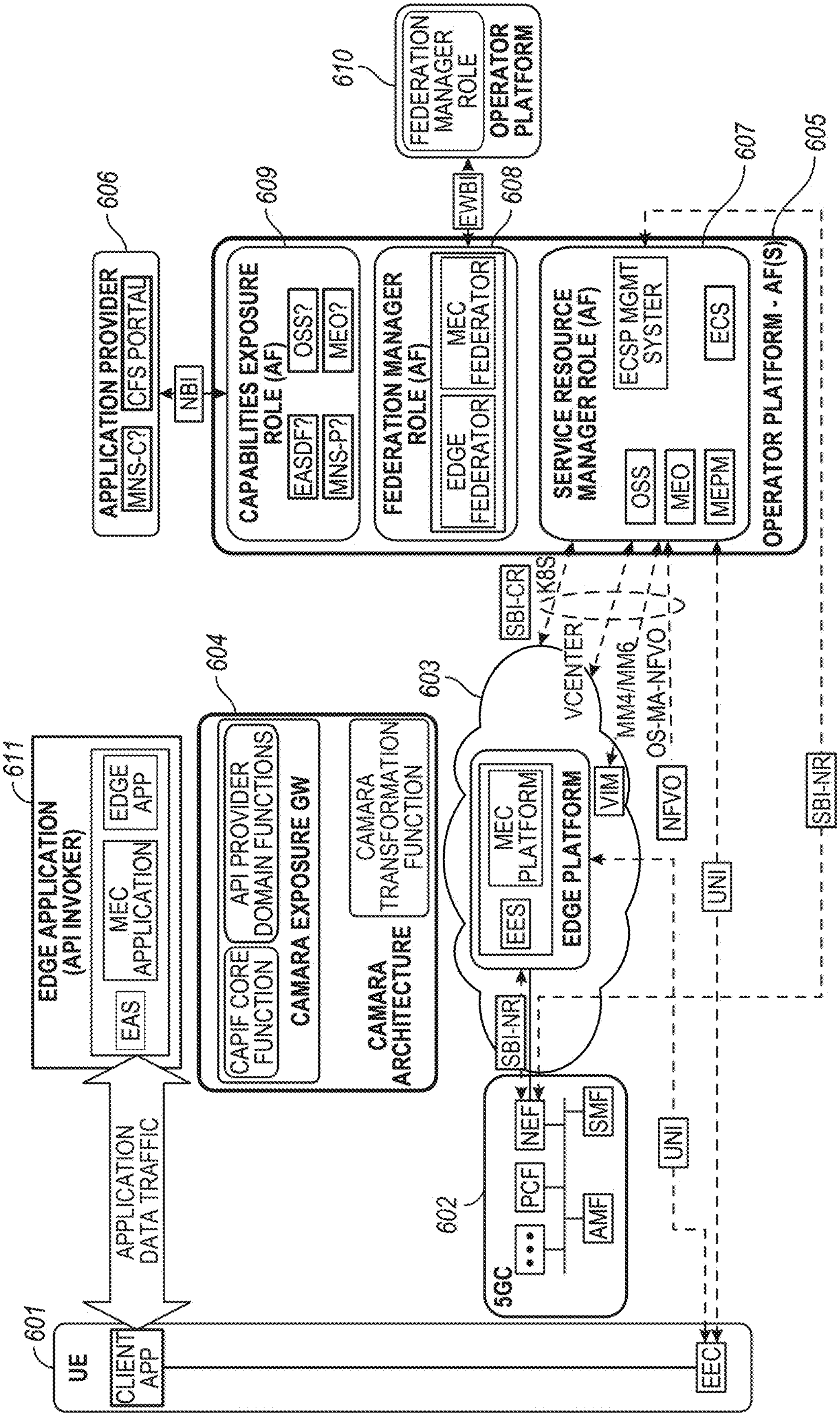
FIG. 6 depicts coordination of OP roles mapped into functional entities of 3GPP EDGEAPP and ETSI MEC reference architectures, according to an example.

In a second approach, depicted in FIG. 6, OP roles are mapped into existing functional entities of 3GPP EDGEAPP and ETSI MEC reference architectures. This deployment includes a similar arrangement where UE 601 is connected to a 5G core 602 and an edge computing platform 603 hosting an edge application 611. A mapping of the OP roles to the existing functional blocks of the reference 3GPP EDGEAPP and ETSI MEC architectures may be identified, including the complementary role of open source efforts (e.g. by a CAMARA architecture 604 or hyperscaler domains). The OP instance 605 is connected to an application provider 606 via a NBI and connected to a federation manager 610 via an EWBI.

At this level of mapping granularity, all OP roles (Capabilities Exposure Role—CER, Federation Manager Role—FMR, Service Resource Manager Role—SRMR) can be covered by either a single AF representing the OP instance 605, or by multiple and distinct AFs. The choice of an OP instance deployment variant reflects a different business scenario, where a single or different service providers can undertake the different OP roles. For example, separate roles may be provided by a service resource manager role 607, a federation manager role 608, or a capabilities exposure role 609.

In a third approach, depicted among FIGS. 7 to 11, various embodiments are identified to enable standard development organizations to migrate toward a full support of GSMA requirements for the OP architecture. The many constraints that may be considered in the various implementations include: (i) backward compatibility with previous releases of the standards; (ii) progressive alignment between ETSI MEC and 3GPP for edge computing architectures, independently from an OP, and allowing even a standalone system to work properly; (iii) alignment of the ETSI and 3GPP architectures for a full support of OP requirements (e.g., from 3GPP Release 18 and from MEC Phase 3); (iv) interoperability, and providing a common industry reference for the edge computing adoption, by respecting an heterogeneous scenario, where some systems could be still ETSI MEC compliant, some others only 3GPP compliant, and others following the synergized approach; and (v) avoiding duplication of work, from the two SDOs, while using the existing functionalities already standardized by ETSI and 3GPP. In light of these objectives, the following embodiments are described.

Implementation 1—Implementation as MEC-Based Edge Application Instance LCM

Figure 7:
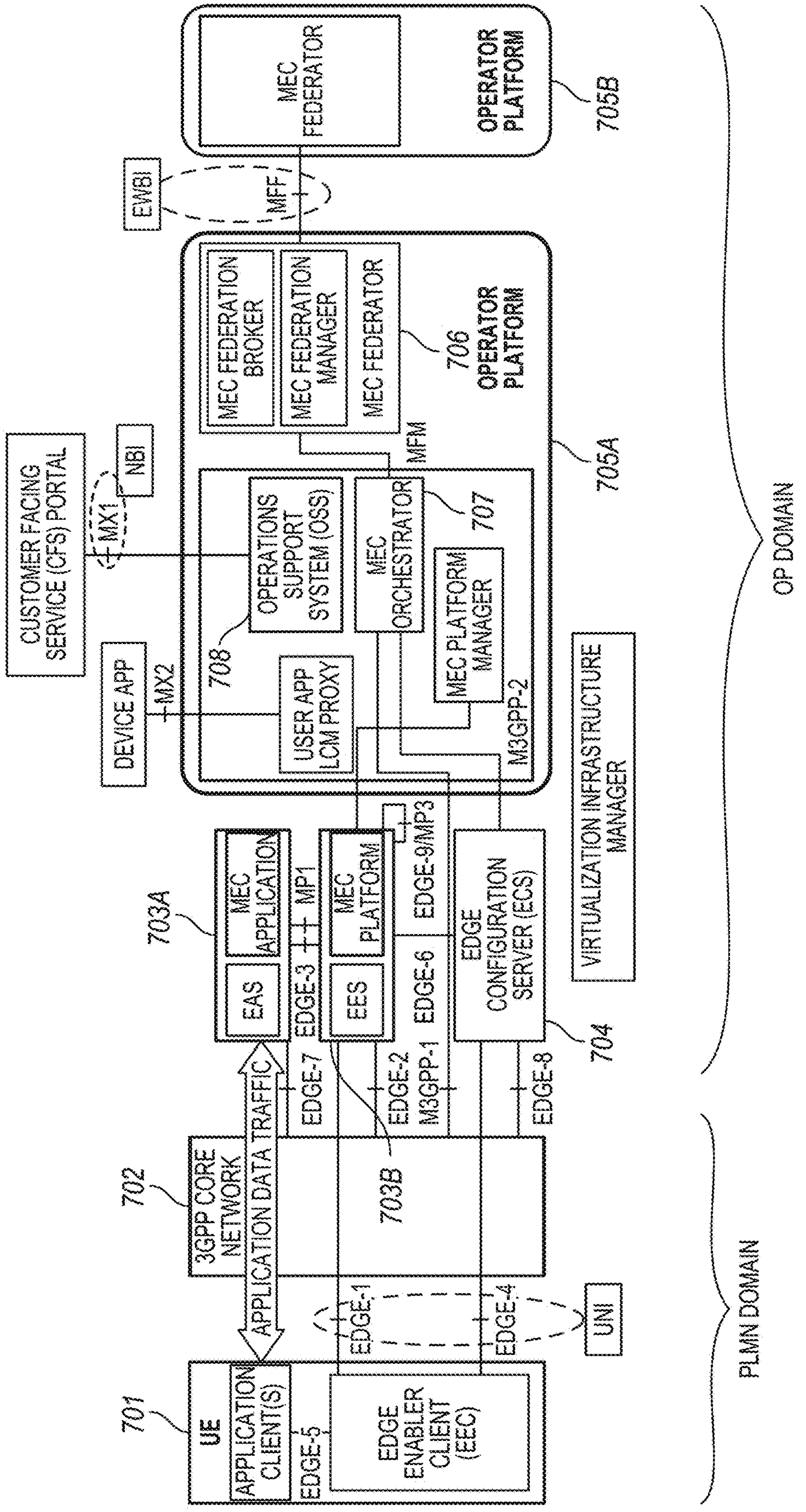
FIG. 7, FIG. 8, FIG. 9, FIG. 10, and FIG. 11 depict respective implementation diagrams of an OP instance for an ETSI MEC environment, according to examples.

FIG. 7 depicts a first example, showing a UE 701 connected to a 3GPP core network 702, which communicates application data traffic to a MEC application 703A at an ETSI MEC system in the OP domain, and to an EES 703B at a 3GPP EDGEAPP system in the OP domain.

In this example, the ETSI MEC system is responsible for edge application LCM. For instance, the MEC Federator 706 in the OP 705A undertakes the federation management (FM) role and the MEC Orchestrator 707 in the OP 705A undertakes the Service Resource Manager (SRM) role. Further, the MEC Orchestrator 707 may connect to the ECS 704, to enable all applications (including EDGEAPP applications) to be managed by the ETSI MEC system. Moreover, the Capabilities Exposure (CE) Role can be undertaken by an OSS 708 in the OP 705A, with proper updates/enhancements in the ETSI MEC standard.

Current specifications in ETSI MEC propose use of an Mx2 reference point for a single MEC system management, but the Mx1 reference point can provide a NBI reference point in the MEC Federation. Accordingly, further Mx1 enhancements may be provided.

In an example, the following steps and configurations may be provided to fully support an OP:

- The Mx1 reference point can be enhanced to support NBI requirements from GSMA. This may be aligned with the APIs and transformation function in CAMARA. In other words, the Mx1 reference point can communicate all NBI messages that are needed between the application developer and the OP instance 705A, in terms of edge application LCM (e.g., registration, de-registration, update, and discovery).
- A reference point named M3GPP-2 (or the like) can be introduced, interconnecting the MEC system's MEC Orchestrator 707 (MEO, part of OP instance 705A AF) to the EDGEAPP system's Edge Configuration Server (ECS 704—deployed as a separate AF). In terms of information exchange, the ECS 704 may provide to the MEO updates on the EESs (e.g., EES 703B) that are registered, deregistered or with registration updates (e.g., regarding EES capabilities), to enable the MEO to have an overall view of the overall deployment covering both MEC platforms and EESs (especially in case of non-co-located EDGEAPP and ETSI MEC systems).

With such ECS/MEO interaction enablement, the MEC orchestrator 707 will have information in the synergized deployment to decide upon application package onboarding and application instantiation, based on capabilities of the available MEC platforms and EESs and the edge infrastructure they are instantiated at. Ultimately, some finalization of the MEC Federator definitions in ETSI MEC may be used to align with the GSMA OPAG activities on EWBI APIs (e.g., between operator platforms OP 705A, OP 705B).

Implementation 2—Implementation as Two Standalone LCM Systems

Figure 8:
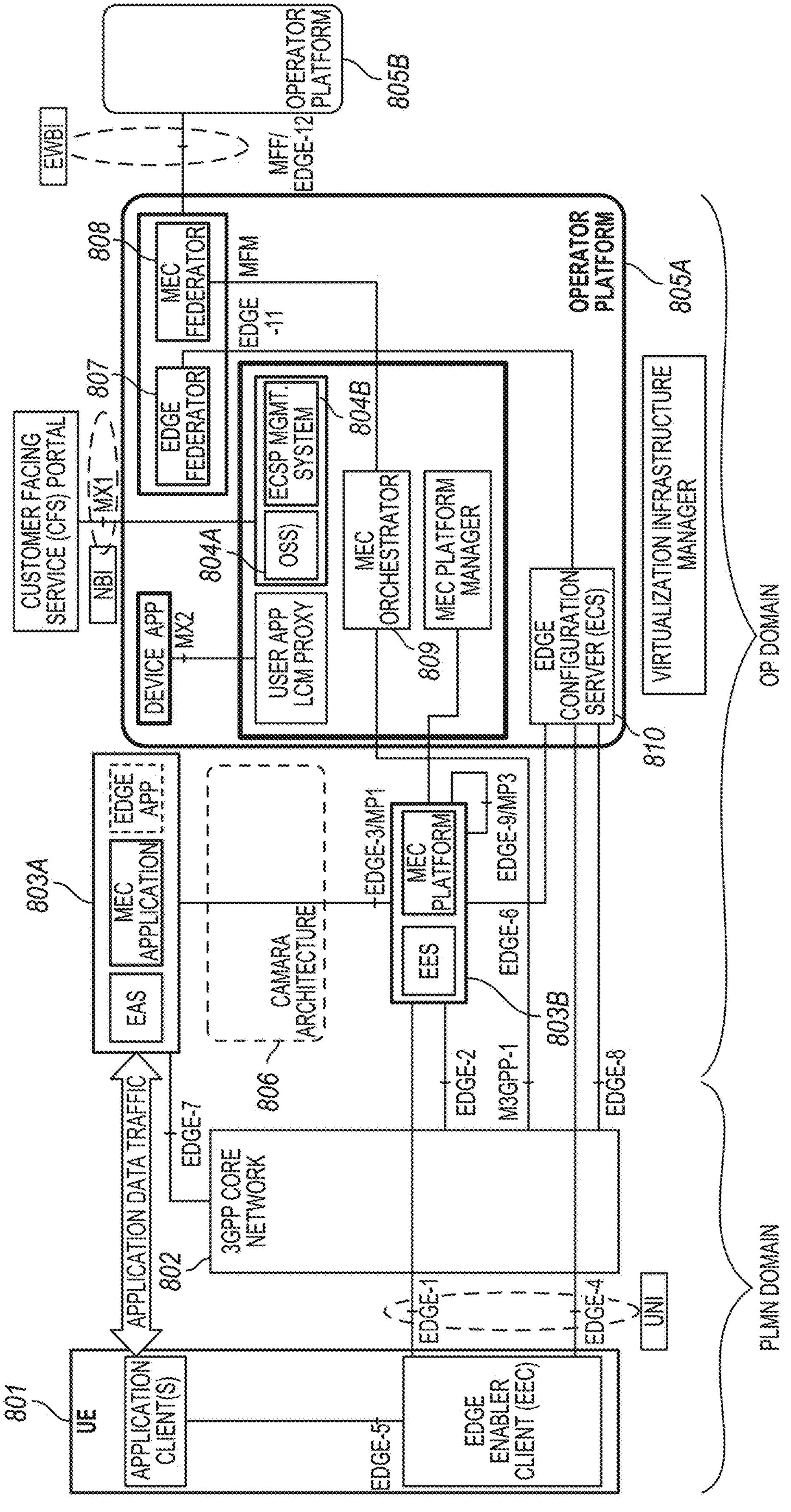

FIG. 8 depicts a second example, showing a UE 801 connected to a 3GPP core network 802, via ETSI MEC application client(s) and 3GPP EDGEAPP edge enabler client(s). The UE 801 provides application data traffic to a MEC application at an ETSI MEC system 803A in the OP domain and an EES at an EDGEAPP system 803B in the OP domain, connected via a CAMARA architecture 806.

Here, the two systems (ETSI MEC and 3GPP EDGEAPP systems 803A, 803B) are configured to separately manage LCM of their edge applications, respectively, by using the MEC Orchestrator 809 (connected to the MEC Federator, as FM role) and the ECS 810 connected to the Edge Federator (acting again as FM role in the OP architecture). Further, in this example, there is also a unique reference point relevant for a NBI, and the CE role is represented by an OSS 804A (in case of an ETSI MEC system) or by an Edge Cloud Service Provider (ECSP) management system 804B (in case of an 3GPP EDGEAPP system). In other words, a single system (either 3GPP EDGEAPP or ETSI MEC) can exist in a standalone way and implement an OP instance 805A, where each OP role is covered by complementary blocks defined in the two systems, respectively.

This implementation identifies the following steps to fully support the OP:

- 3GPP can extend its capability by defining a new component named "Edge Federator" 807 to connect multiple MNOs to an Edge deployment. The current EDGEAPP architecture can be extended by adding an Edge Federator 807 (connected with one or more ECS in an operator platform in an MNO network), and which can leverage all the current definitions of the MEC Federator 808 specified in ETSI MEC, to avoid duplication of work. 3GPP and ETSI MEC can also align the Edge Federator 807 and MEC Federator 808 for better alignment and coexistence. For instance, 3GPP can inherit some of the design principles from the MEC Federator as defined by ETSI MEC. The Edge Federator 807 can further connect, using an EDGE-12 interface, with other Edge Federators at other MNOs (e.g., at OP 805B, such as for another Edge Federator acting as Federation Manager Role and/or Federation Broker Role in the OP).
- 3GPP can define new interfaces EDGE-11 (between ECS 803B and Edge Federator 807) and EDGE-12 (between Edge Federator 807 and other Edge Federators in MNOs). In principle the EDGE-12 interface needs to be aligned with Mff interface for proper interworking, in case of two OP instances implemented by an EDGEAPP system and a ETSI MEC system. However, with a definition of a standardized reference point, there should be no issue in principle for interworking between two OP instances implemented by different systems.
- The ECSP Management System 804B is the Producer of the Provisioning MnS and provides life cycle management of the Edge Federator 807 along with other edge components. As such, this block is aligned with the OSS 804A in ETSI MEC. Also the OSS 804A in ETSI MEC should leverage, whenever feasible, the 3GPP definitions that are relevant for the CE role. Similar to Implementation 1 (depicted in FIG. 7), the Mx1 reference point can be enhanced, to support NBI requirements from GSMA.

Figure 9:
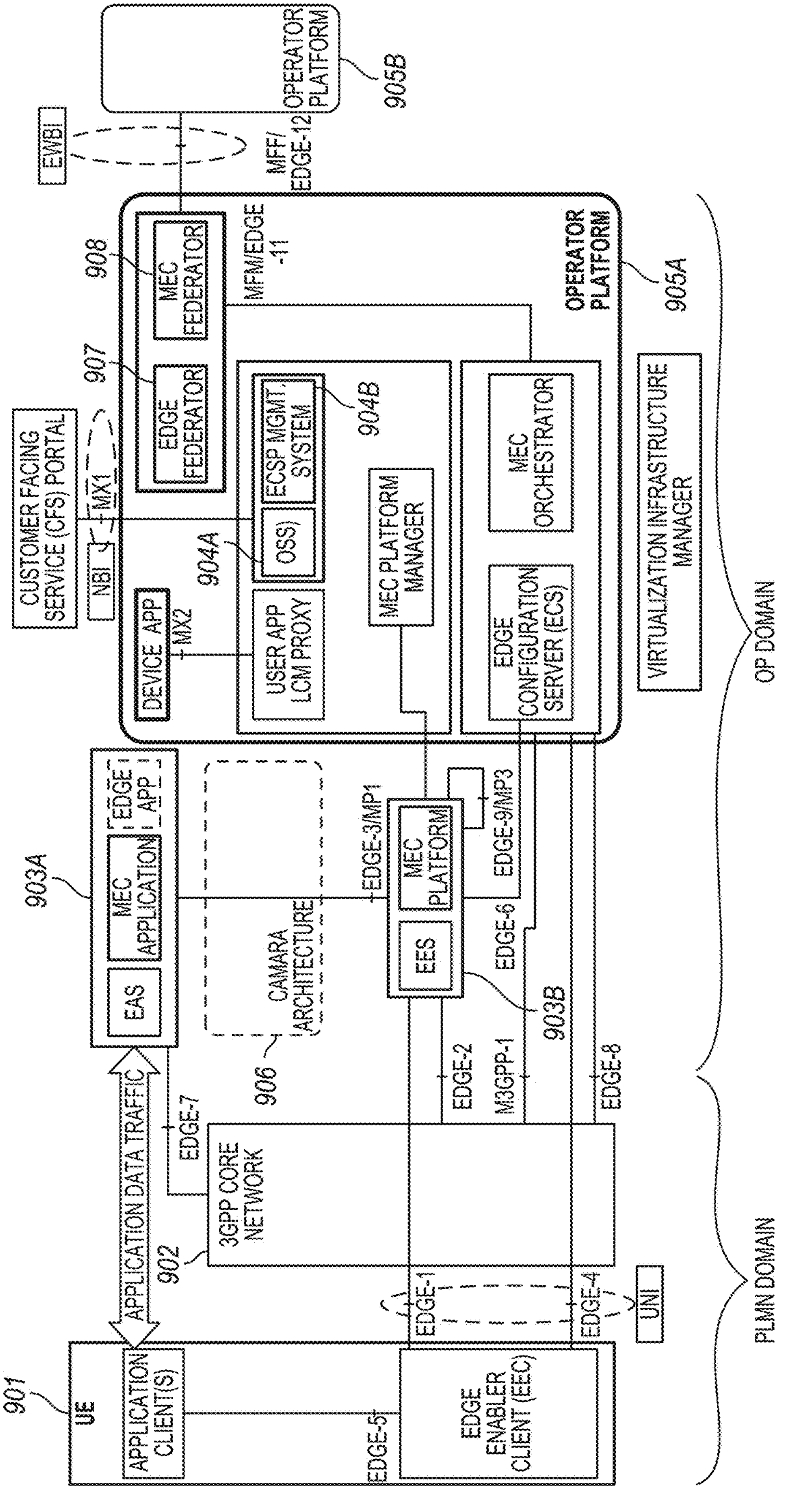

Implementation 3—Implementation as a Single, Synergized Edge Application Instance LCM System FIG. 9 depicts a third example, which differs on how the edge app LCM is realized. This shows a UE 901 with application client(s) connected to an ETSI MEC system 903A in the OP domain, and 3GPP EDGEAPP edge enabler client(s) connected to a 3GPP Core Network 902. The UE 901 provides application data traffic to a MEC application at an ETSI MEC system 903A and an EES at an EDGEAPP system 903B in the OP domain, connected via a CAMARA architecture 906.

In this scenario, both of a MEC Orchestrator 909 and a ECS 910 can be more tightly connected (and possibly also interworking) in order to enable a single, synergized edge application instance LCM system. On the NBI side, similar to the second example of FIG. 8, there is a unique reference point relevant for NBI, and the CE role is represented by an OSS 904A (in case of ETSI MEC system) or by ECSP management system 904B (in case of 3GPP EDGEAPP).

Also in this implementation, a single system (either 3GPP EDGEAPP or ETSI MEC) can exist in a standalone way, to implement an OP instance 905A where each OP role is covered by complementary blocks defined in the two systems, respectively. However, for optimized deployments of products compliant with both standards, some interworking between MEC Orchestrator and ECS can be provided.

This implementation identifies the following steps to support the OP:

3GPP can define an Edge Federator 907 similar to Implementation 3. Additionally, 3GPP and ETSI MEC can align the Edge Federator 907 and a MEC Federator 908 along with an aligned and common interface (EDGE-11/Mfm) between the Edge/MEC Federator and the 3GPP/MEC LCM system (ECSP management system, and MEC Orchestrator).

Similar to Implementation 2, the ECSP Management System 904B can be aligned with the OSS 904A in ETSI MEC. Also the OSS 904A in ETSI MEC can leverage, as feasible, the 3GPP definitions that are relevant for a CE role. As per Implementation 1, the Mx1 reference point should be enhanced, to support NBI requirements from GSMA.

ETSI MEC and 3GPP SA5 may also be aligned on edge application instance LCM. Accordingly, the MEO 909 and the ECSP management system 904B can interact on co-shaping a policy for edge application instance LCM, on the basis of common edge platform (EES/MEC platform) information, available by an "over-the-top" Edge/MEC Federator information exchange across OP instances (e.g., between OP instances 905A, 905B).

Implementation 4—Multiple LCM Systems with LCM Aggregator

A benefit of having standalone systems is addressed in Implementation 2, discussed above. A further variant, depicted in FIG. 10, shows an architecture designed to allow also third-party LCM components, useful in cloud native settings. In this variant, an LCM aggregator 1001 is introduced, as a convenient AF in the system, in charge of integrating the co-existence of different LCM components (e.g., among the MEC orchestrator, ECS, and other edge orchestrators).

Here, the steps and configurations identified for Implementation 2 may be used. In addition, since a Federation Manager Role is connected to multiple LCM systems, a common interface between them should be defined, while single reference points to the respective orchestrators can be defined.

The approach of how such LCM aggregator 1001 operates is similar to the one followed by the CAMARA project to provide a unified API to an application developer. In this example, the LCM aggregator 1001 is beyond a simple exposure gateway of orchestrator messages, as a transformation step is needed for e.g., a MEC Federator to comprehend (such as with ECS and/or other edge orchestrators besides MEO).

Implementation 5—MEC-Based App LCM, with OP as Single AF

Figure 11:
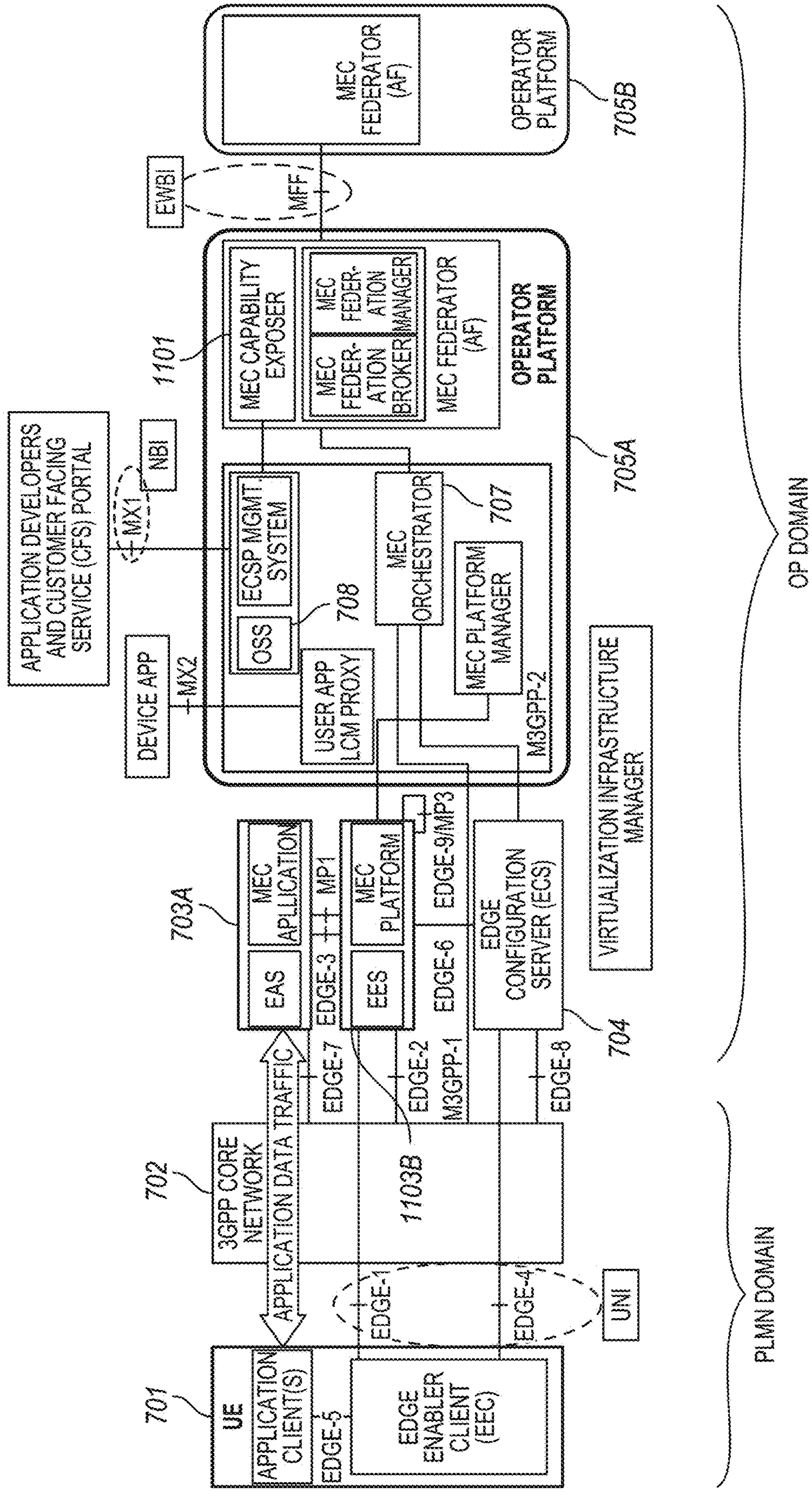

FIG. 11 depicts a further variant of Implementation 1, which enables another mapping of a CE role. In fact, having a single and new entity (mapped 1:1 with the CE role in the OP) can facilitate the evolution of ETSI MEC and EDGEAPP architectures, and can also simplify the consequent certification of OP products.

This implementation identifies the use of a MEC capability exposer 1101, with the following steps to support the OP:

- ETSI MEC Orchestrator interacts with ECS (e.g., discussed in Implementation 1, above, proposing the M3GPP-2 reference point).
- Inclusion of the OP's CE Role in the MEC Federator, so that a MEC Federator is representing the OP instance as a whole. In this case, for federation purposes, the OSS would play a simple role (e.g., as a type of gateway or proxy). In fact, a current definition of the OSS is used with MEC, for LCM internal aspects of a single MEC system and not for MEC Federation. On the other side, requirements from GSMA OPG may define a functional block in standards to cover these requirements.

Accordingly, this variation keeps the OSS in accordance with ETSI MEC specifications, and defines all OPG-specific duties in the MEC Capability Exposer 1101, which is specifically provided for federation purposes.

Implementation in Edge Computing Scenarios

It will be understood that the present techniques associated with MEC federation and OP operability may be integrated with many aspects of edge computing strategies and deployments. Edge computing, at a general level, refers to the transition of compute and storage resources closer to endpoint devices (e.g., consumer computing devices, user equipment, etc.) to optimize total cost of ownership, reduce application latency, improve service capabilities, and improve compliance with security or data privacy requirements. Edge computing may, in some scenarios, provide a cloud-like distributed service that offers orchestration and management for applications among many types of storage and compute resources. As a result, some implementations of edge computing have been referred to as the "edge cloud" or the "fog", as powerful computing resources previously available only in large remote data centers are moved closer to endpoints and made available for use by consumers at the "edge" of the network.

Figure 12:
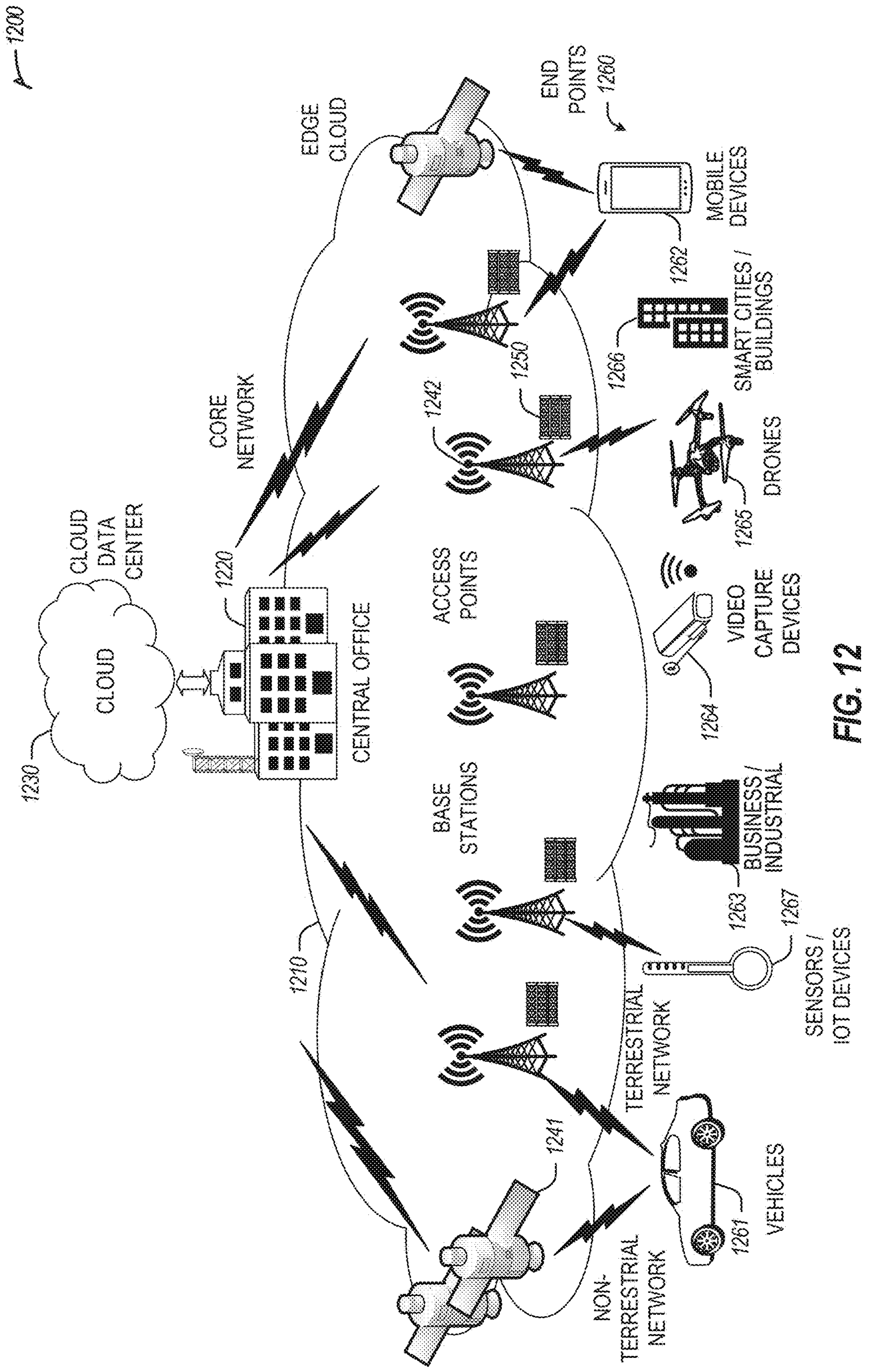
FIG. 12 illustrates an overview of an edge cloud configuration for edge computing, according to an example.

FIG. 12 is a block diagram 1200 showing an overview of a configuration for edge computing, which includes a layer of processing referenced in many of the current examples as an "edge cloud". This network topology, which may include several conventional networking layers (including those not shown herein), may be extended through the use of the satellite and non-terrestrial network communication arrangements discussed herein.

As shown, the edge cloud 1210 is co-located at an edge location, such as a satellite vehicle 1241, a base station 1242, a local processing hub 1250, or a central office 1220, and thus may include multiple entities, devices, and equipment instances. The edge cloud 1210 is located much closer to the endpoint (consumer and producer) data sources 1260 (e.g., autonomous vehicles 1261, user equipment 1262, business and industrial equipment 1263, video capture devices 1264, drones 1265, smart cities, and building devices 1266, sensors and IoT devices 1267, etc.) than the cloud data center 1230. Compute, memory, and storage resources which are offered at the edges in the edge cloud 1210 are critical to providing ultra-low or improved latency response times for services and functions used by the endpoint data sources 1260 as well as reduce network backhaul traffic from the edge cloud 1210 toward cloud data center 1230 thus improving energy consumption and overall network usages among other benefits.

Compute, memory, and storage are scarce resources, and generally decrease depending on the edge location (e.g., fewer processing resources being available at consumer end point devices than at a base station or a central office). However, the closer that the edge location is to the endpoint (e.g., UEs), the more that space and power are constrained. Thus, edge computing, as a general design principle, attempts to minimize the number of resources needed for network services, through the distribution of more resources that are located closer both geographically and in-network access time. In the scenario of the non-terrestrial network, distance and latency may be far from the satellite, but data processing may be better accomplished at edge computing hardware in the satellite vehicle rather than requiring additional data connections and network backhaul to and from the cloud.

In an example, an edge cloud architecture extends beyond typical deployment limitations to address restrictions that some network operators or service providers may have in their infrastructures. These include a variety of configurations based on the edge location (because edges at a base station level, for instance, may have more constrained performance); configurations based on the type of compute, memory, storage, fabric, acceleration, or like resources available to edge locations, tiers of locations, or groups of locations; the service, security, and management and orchestration capabilities; and related objectives to achieve usability and performance of end services.

Edge computing is a developing paradigm where computing is performed at or closer to the "edge" of a network, typically through the use of a compute platform implemented at base stations, gateways, network routers, or other devices which are much closer to the end point devices producing and consuming the data. For example, edge gateway servers may be equipped with pools of memory and storage resources to perform computation in real-time for low latency use-cases (e.g., autonomous driving or video surveillance) for connected client devices. Or as an example, base stations may be augmented with compute and acceleration resources to directly process service workloads for connected user equipment, without further communicating data via backhaul networks. Or as another example, central office network management hardware may be replaced with compute hardware that performs virtualized network functions and offers compute resources for the execution of services and consumer functions for connected devices. Likewise, within edge computing deployments, there may be scenarios in services in which the compute resource will be "moved" to the data, as well as scenarios in which the data will be "moved" to the compute resource. Or as an example, a base station (or satellite vehicle) compute, acceleration and network resources can provide services to scale to workload demands on an as-needed basis by activating dormant capacity (subscription, capacity-on-demand) to manage corner cases, emergencies or to provide longevity for deployed resources over a significantly longer implemented lifecycle.

In contrast to the network architecture of FIG. 12, traditional endpoint (e.g., UE, vehicle-to-vehicle (V2V), vehicle-to-everything (V2X), etc.) applications are reliant on local devices or remote cloud data storage and processing to exchange and coordinate information. A cloud data arrangement allows for long-term data collection and storage but is not optimal for highly time-varying data, such as a collision, traffic light change, etc., and may fail in attempting to meet latency challenges. The extension of satellite capabilities within an edge computing network provides even more possible permutations of managing compute, data, bandwidth, resources, service levels, and the like.

Depending on the real-time requirements in a communications context, a hierarchical structure of data processing and storage nodes may be defined in an edge computing deployment involving satellite connectivity. For example, such a deployment may include local ultra-low-latency processing, regional storage, and processing as well as remote cloud data-center-based storage and processing. Key performance indicators (KPIs) may be used to identify where sensor data is best transferred and where it is processed or stored. This typically depends on the ISO layer dependency of the data. For example, lower layer (PHY, MAC, routing, etc.) data typically changes quickly and is better handled locally to meet latency requirements. Higher layer data such as Application Layer data is typically less time-critical and may be stored and processed in a remote cloud data center.

Figure 13:
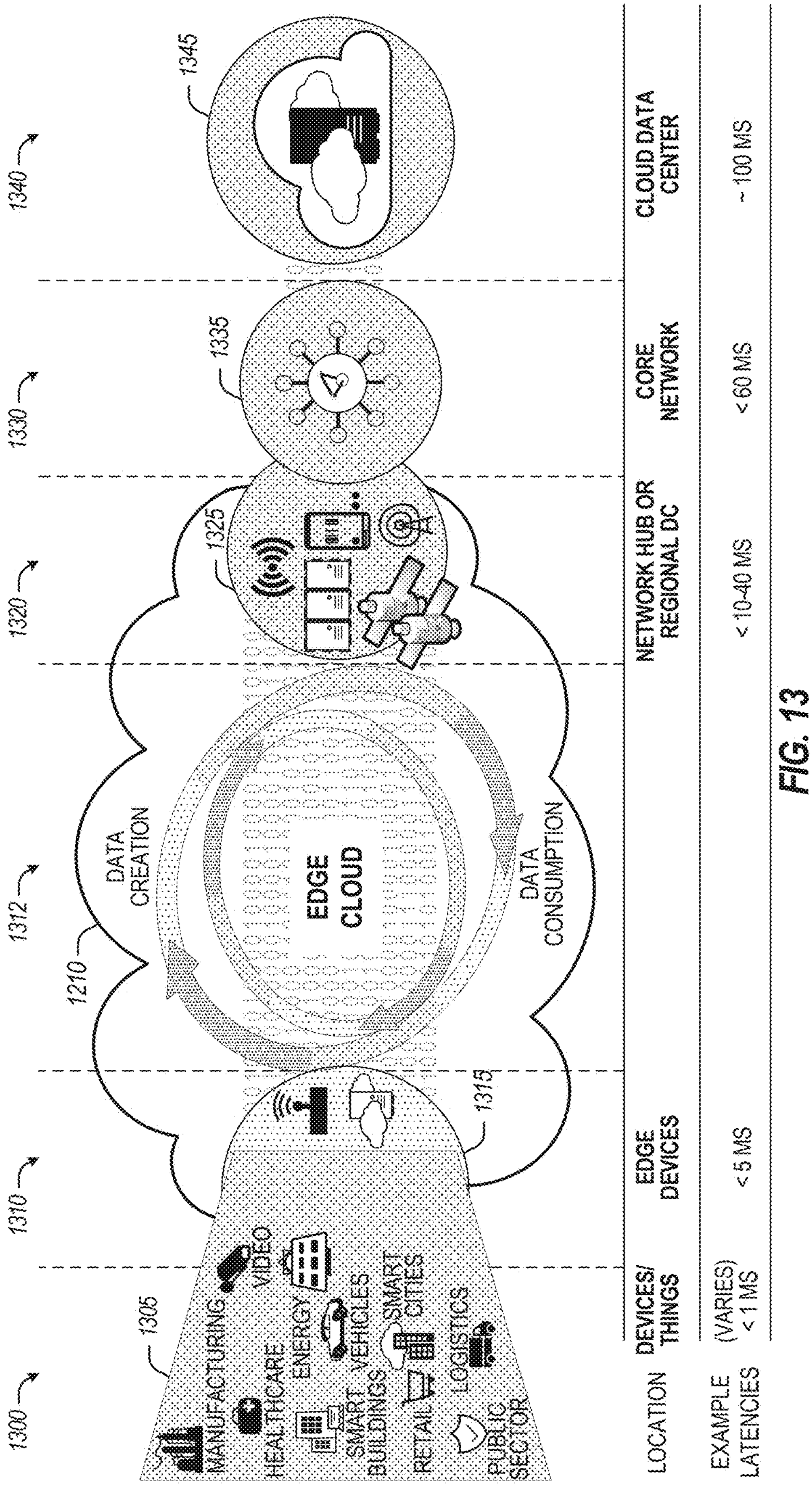
FIG. 13 illustrates an overview of layers of distributed compute deployed among an edge computing system, according to an example.

FIG. 13 illustrates operational layers among endpoints, an edge cloud, and cloud computing environments. Specifically, FIG. 13 depicts examples of computational use cases 1305, utilizing the edge cloud 1210 among multiple illustrative layers of network computing. The layers begin at an endpoint (devices and things) layer 1300, which accesses the edge cloud 1210 to conduct data creation, analysis, and data consumption activities. The edge cloud 1210 may span multiple network layers, such as an edge devices layer 1310 having gateways, on-premise servers, or network equipment (nodes 1315) located in physically proximate edge systems; a network access layer 1320, encompassing base stations, radio processing units, network hubs, regional data centers (DC), or local network equipment (equipment 1325); and any equipment, devices, or nodes located therebetween (in layer 1312, not illustrated in detail). The network communications within the edge cloud 1210 and among the various layers may occur via any number of wired or wireless mediums, including via connectivity architectures and technologies not depicted.

Examples of latency with terrestrial networks, resulting from network communication distance and processing time constraints, may range from less than a millisecond (ms) when among the endpoint layer 1300, under 5 ms at the edge devices layer 1310, to even between 10 to 40 ms when communicating with nodes at the network access layer 1320. (Variation to these latencies is expected with the use of non-terrestrial networks). Beyond the edge cloud, 1210 are core network 1330 and cloud data center 1340 layers, each with increasing latency (e.g., between 50-60 ms at the core network layer 1330, to 100 or more ms at the cloud data center layer). As a result, operations at a core network data center 1335 or a cloud data center 1345, with latencies of at least 50 to 100 ms or more, will not be able to accomplish many time-critical functions of the use cases 1305. Each of these latency values is provided for purposes of illustration and contrast; it will be understood that the use of other access network mediums and technologies may further reduce the latencies. In some examples, respective portions of the network may be categorized as "close edge", "local edge", "near edge", "middle edge", or "far edge" layers, relative to a network source and destination. For instance, from the perspective of the core network data center 1335 or a cloud data center 1345, a central office or content data network may be considered as being located within a "near edge" layer ("near" to the cloud, having high latency values when communicating with the devices and endpoints of the use cases 1305), whereas an access point, base station, on-premise server, or network gateway may be considered as located within a "far edge" layer ("far" from the cloud, having low latency values when communicating with the devices and endpoints of the use cases 1305). It will be understood that other categorizations of a particular network layer as constituting a "close", "local", "near", "middle", or "far" edge may be based on latency, distance, a number of network hops, or other measurable characteristics, as measured from a source in any of the network layers 1300-1340.

The various use cases 1305 may access resources under usage pressure from incoming streams, due to multiple services utilizing the edge cloud. To achieve results with low latency, the services executed within the edge cloud 1210 balance varying requirements in terms of (a) Priority (throughput or latency) and Quality of Service (QoS) (e.g., traffic for an autonomous car may have higher priority than a temperature sensor in terms of response time requirement; or, a performance sensitivity/bottleneck may exist at a compute/accelerator, memory, storage, or network resource, depending on the application); (b) Reliability and Resiliency (e.g., some input streams need to be acted upon and the traffic routed with mission-critical reliability, where as some other input streams may tolerate an occasional failure, depending on the application); and (c) Physical constraints (e.g., power, cooling, and form-factor).

The end-to-end service view for these use cases involves the concept of a service flow and is associated with a transaction. The transaction details the overall service requirement for the entity consuming the service, as well as the associated services for the resources, workloads, workflows, and business functional and business level requirements. The services executed with the "terms" described may be managed at each layer in a way to assure real-time, and runtime contractual compliance for the transaction during the lifecycle of the service. When a component in the transaction is missing its agreed to SLA, the system as a whole (components in the transaction) may provide the ability to (1) understand the impact of the SLA violation, and (2) augment other components in the system to resume overall transaction SLA, and (3) implement steps to remediate.

Thus, with these variations and service features in mind, edge computing within the edge cloud 1210 may provide the ability to serve and respond to multiple applications of the use cases 1305 (e.g., object tracking, video surveillance, connected cars, etc.) in real-time or near real-time, and meet ultra-low latency requirements for these multiple applications. These advantages enable a whole new class of applications (Virtual Network Functions (VNFs), Function as a Service (FaaS), Edge as a Service (EaaS), etc.), which cannot leverage conventional cloud computing due to latency or other limitations. This is especially relevant for applications that require connection via satellite, and the additional latency that trips via satellite would require to the cloud.

However, with the advantages of edge computing come the following caveats. The devices located at the edge are often resource-constrained and therefore there is pressure on the usage of edge resources. Typically, this is addressed through the pooling of memory and storage resources for use by multiple users (tenants) and devices. The edge may be power and cooling constrained and therefore the power usage needs to be accounted for by the applications that are consuming the most power. There may be inherent power-performance tradeoffs in these pooled memory resources, as many of them are likely to use emerging memory technologies, where more power requires greater memory bandwidth. Likewise, improved security of hardware and root of trust trusted functions are also required because edge locations may be unmanned and may even need permissioned access (e.g., when housed in a third-party location). Such issues are magnified in the edge cloud 1210 in a multi-tenant, multi-owner, or multi-access setting, where services and applications are requested by many users, especially as network usage dynamically fluctuates and the composition of the multiple stakeholders, use cases, and services changes.

At a more generic level, an edge computing system may be described to encompass any number of deployments at the previously discussed layers operating in the edge cloud 1210 (network layers 1300-1340), which provide coordination from the client and distributed computing devices. One or more edge gateway nodes, one or more edge aggregation nodes, and one or more core data centers may be distributed across layers of the network to provide an implementation of the edge computing system by or on behalf of a telecommunication service provider ("telco", or "TSP"), internet-of-things service provider, cloud service provider (CSP), enterprise entity, or any other number of entities. Various implementations and configurations of the edge computing system may be provided dynamically, such as when orchestrated to meet service objectives.

Consistent with the examples provided herein, a client compute node may be embodied as any type of endpoint component, circuitry, device, appliance, or other things capable of communicating as a producer or consumer of data. Further, the label "node" or "device" as used in the edge computing system does not necessarily mean that such node or device operates in a client or agent/minion/follower role; rather, any of the nodes or devices in the edge computing system refer to individual entities, nodes, or subsystems which include discrete or connected hardware or software configurations to facilitate or use the edge cloud 1210.

As such, the edge cloud 1210 is formed from network components and functional features operated by and within edge gateway nodes, edge aggregation nodes, or other edge compute nodes among network layers 1310-1330. The edge cloud 1210 thus may be embodied as any type of network that provides edge computing and/or storage resources that are proximately located to radio access network (RAN) capable endpoint devices (e.g., mobile computing devices, IoT devices, smart devices, etc.), which are discussed herein. In other words, the edge cloud 1210 may be envisioned as an "edge" that connects the endpoint devices and traditional network access points that serve as an ingress point into service provider core networks, including mobile carrier networks (e.g., Global System for Mobile Communications (GSM) networks, Long-Term Evolution (LTE) networks, 5G/6G networks, etc.), while also providing storage and/or compute capabilities. Other types and forms of network access (e.g., Wi-Fi, long-range wireless, wired networks including optical networks) may also be utilized in place of or in combination with such 3GPP carrier networks.

The network components of the edge cloud 1210 may be servers, multi-tenant servers, appliance computing devices, and/or any other type of computing device. For example, a node of the edge cloud 1210 may include an appliance computing device that is a self-contained electronic device including a housing, a chassis, a case, or a shell. In some circumstances, the housing may be dimensioned for portability such that it can be carried by a human and/or shipped. Example housings may include materials that form one or more exterior surfaces that partially or fully protect contents of the appliance, in which protection may include weather protection, hazardous environment protection (e.g., EMI, vibration, extreme temperatures), and/or enable submergibility. Example housings may include power circuitry to provide power for stationary and/or portable implementations, such as AC power inputs, DC power inputs, AC/DC or DC/AC converter(s), power regulators, transformers, charging circuitry, batteries, wired inputs and/or wireless power inputs. Example housings and/or surfaces thereof may include or connect to mounting hardware to enable attachment to structures such as buildings, telecommunication structures (e.g., poles, antenna structures, etc.), and/or racks (e.g., server racks, blade mounts, etc.). Example housings and/or surfaces thereof may support one or more sensors (e.g., temperature sensors, vibration sensors, light sensors, acoustic sensors, capacitive sensors, proximity sensors, etc.). One or more such sensors may be contained in, carried by, or otherwise embedded in the surface and/or mounted to the surface of the appliance. Example housings and/or surfaces thereof may support mechanical connectivity, such as propulsion hardware (e.g., wheels, propellers, etc.) and/or articulating hardware (e.g., robot arms, pivotable appendages, etc.). In some circumstances, the sensors may include any type of input device such as user interface hardware (e.g., buttons, switches, dials, sliders, etc.). In some circumstances, example housings include output devices contained in, carried by, embedded therein, and/or attached thereto. Output devices may include displays, touchscreens, lights, LEDs, speakers, I/O ports (e.g., USB), etc. In some circumstances, edge devices are devices presented in the network for a specific purpose (e.g., a traffic light), but may have processing and/or other capacities that may be utilized for other purposes. Such edge devices may be independent of other networked devices and may be provided with a housing having a form factor suitable for its primary purpose; yet be available for other compute tasks that do not interfere with its primary task. Edge devices include Internet of Things devices. The appliance computing device may include hardware and software components to manage local issues such as device temperature, vibration, resource utilization, updates, power issues, physical and network security, etc. Example hardware for implementing an appliance computing device is described in conjunction with FIG. 16B. The edge cloud 1210 may also include one or more servers and/or one or more multi-tenant servers. Such a server may include an operating system and implement a virtual computing environment. A virtual computing environment may include a hypervisor managing (e.g., spawning, deploying, destroying, etc.) one or more virtual machines, one or more containers, etc. Such virtual computing environments provide an execution environment in which one or more applications and/or other software, code, or scripts may execute while being isolated from one or more other applications, software, code, or scripts.

Figure 14:
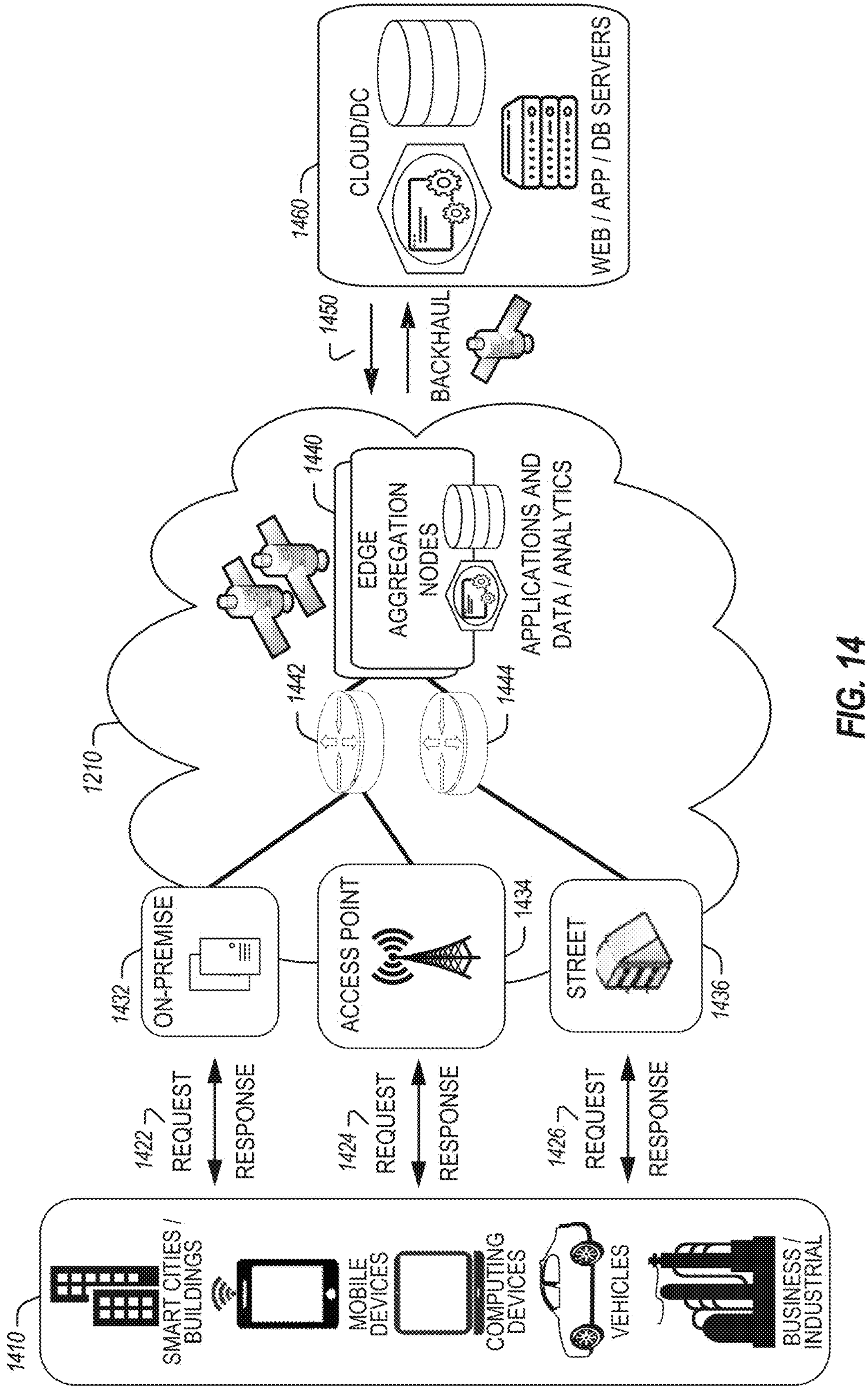
FIG. 14 illustrates operational layers among endpoints, an edge cloud, and cloud computing environments, according to an example.

In FIG. 14, various client endpoints 1410 (in the form of mobile devices, computers, autonomous vehicles, business computing equipment, industrial processing equipment) exchange requests and responses that are specific to the type of endpoint network aggregation. For instance, client endpoints 1410 may obtain network access via a wired broadband network, by exchanging requests and responses 1422 through an on-premise network system 1432. Some client endpoints 1410, such as mobile computing devices, may obtain network access via a wireless broadband network, by exchanging requests and responses 1424 through an access point (e.g., cellular network tower) 1434. Some client endpoints 1410, such as autonomous vehicles may obtain network access for requests and responses 1426 via a wireless vehicular network through a street-located network system 1436. However, regardless of the type of network access, the TSP may deploy aggregation points 1442, 1444 within the edge cloud 1210 to aggregate traffic and requests. Thus, within the edge cloud 1210, the TSP may deploy various compute and storage resources, such as at edge aggregation nodes 1440 (including those located at satellite vehicles), to provide requested content. The edge aggregation nodes 1440 and other systems of the edge cloud 1210 are connected to a cloud or data center 1460, which uses a backhaul network 1450 (such as a satellite backhaul) to fulfill higher-latency requests from a cloud/data center for websites, applications, database servers, etc. Additional or consolidated instances of the edge aggregation nodes 1440 and the aggregation points 1442, 1444, including those deployed on a single server framework, may also be present within the edge cloud 1210 or other areas of the TSP infrastructure.

At a more generic level, an edge computing system may be described to encompass any number of deployments operating in the edge cloud 1210, which provide coordination from the client and distributed computing devices. FIG. 13 provides a further abstracted overview of layers of distributed compute deployed among an edge computing environment for purposes of illustration.

Figure 15:
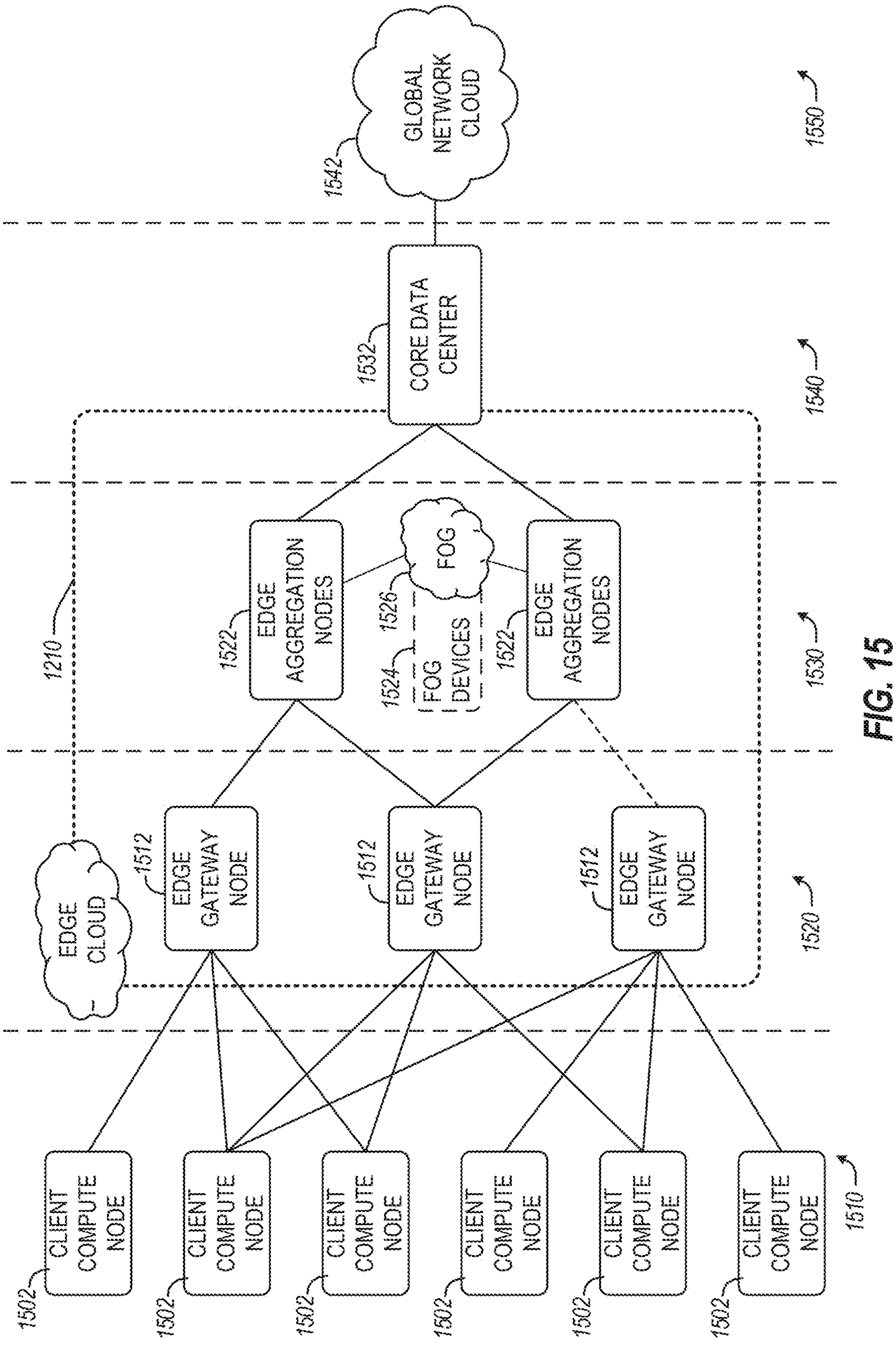
FIG. 15 illustrates an example approach for networking and services in an edge computing system, according to an example.

FIG. 15 generically depicts an edge computing system for providing edge services and applications to multi-stakeholder entities, as distributed among one or more client compute nodes 1502, one or more edge gateway nodes 1512, one or more edge aggregation nodes 1522, one or more core data centers 1532, and a global network cloud 1542, as distributed across layers 1510, 1520, 1530, 1540, and 1550 of the network. The implementation of the edge computing system may be provided at or on behalf of a telecommunication service provider ("telco", or "TSP"), internet-of-things service provider, cloud service provider (CSP), enterprise entity, or any other number of entities.

Each node or device of the edge computing system is located at a particular layer (of layers 1510, 1520, 1530, 1540, and 1550) corresponding to layers 1300, 1310, 1320, 1330, 1340. For example, the client compute nodes 1502 are each located at an endpoint layer 1310, while each of the edge gateway nodes 1512 are located at an edge devices layer 1320 (local level) of the edge computing system. Additionally, each of the edge aggregation nodes 1522 (and/or fog devices 1524, if arranged or operated with or among a fog networking configuration 1526) are located at a network access layer 1330 (an intermediate level). Fog computing (or "fogging") generally refers to extensions of cloud computing to the edge of an enterprise's network, typically in a coordinated distributed or multi-node network. Some forms of fog computing provide the deployment of compute, storage, and networking services between end devices and cloud computing data centers, on behalf of the cloud computing locations. Such forms of fog computing provide operations that are consistent with edge computing as discussed herein; many of the edge computing aspects discussed herein apply to fog networks, fogging, and fog configurations. Further, aspects of the edge computing systems discussed herein may be configured as a fog, or aspects of fog may be integrated into an edge computing architecture.

The core data center 1532 is located at a core network layer 1330 (e.g., a regional or geographically-central level), while the global network cloud 1542 is located at a cloud data center layer 1340 (e.g., a national or global layer). The use of "core" is provided as a term for a centralized network location—deeper in the network—which is accessible by multiple edge nodes or components; however, a "core" does not necessarily designate the "center" or the deepest location of the network. Accordingly, the core data center 1532 may be located within, at, or near the edge cloud 1210.

Although an illustrative number of client compute nodes 1502, edge gateway nodes 1512, edge aggregation nodes 1522, core data centers 1532, global network clouds 1542 are shown in FIG. 15, it should be appreciated that the edge computing system may include more or fewer devices or systems at each layer. Additionally, as shown in FIG. 13, the number of components of each layer 1300, 1310, 1320, 1330, 1340 generally increases at each lower level (i.e., when moving closer to endpoints). As such, one edge gateway node 1512 may service multiple client compute nodes 1502, and one edge aggregation node 1522 may service multiple edge gateway nodes 1512.

Consistent with the examples provided herein, each client compute node 1502 may be embodied as any type of end point component, device, appliance, or "thing" capable of communicating as a producer or consumer of data. Further, the label "node" or "device" as used in the edge computing system 1500 does not necessarily mean that such node or device operates in a client or agent/minion/follower role; rather, any of the nodes or devices in the edge computing system 1500 refer to individual entities, nodes, or subsystems which include discrete or connected hardware or software configurations to facilitate or use the edge cloud 1210.

As such, the edge cloud 1210 is formed from network components and functional features operated by and within the edge gateway nodes 1512 and the edge aggregation nodes 1522 of layers 1320, 1330, respectively. The edge cloud 1210 may be embodied as any type of network that provides edge computing and/or storage resources that are proximately located to radio access network (RAN) capable endpoint devices (e.g., mobile computing devices, IoT devices, smart devices, etc.), which are shown in FIG. 13 as the client compute nodes 1502. In other words, the edge cloud 1210 may be envisioned as an "edge" that connects the endpoint devices and traditional mobile network access points that serves as an ingress point into service provider core networks, including carrier networks (e.g., Global System for Mobile Communications (GSM) networks, Long-Term Evolution (LTE) networks, 5G networks, etc.), while also providing storage and/or compute capabilities. Other types and forms of network access (e.g., Wi-Fi, long-range wireless networks) may also be utilized in place of or in combination with such 3GPP carrier networks.

In some examples, the edge cloud 1210 may form a portion of or otherwise provide an ingress point into or across a fog networking configuration 1526 (e.g., a network of fog devices 1524, not shown in detail), which may be embodied as a system-level horizontal and distributed architecture that distributes resources and services to perform a specific function. For instance, a coordinated and distributed network of fog devices 1524 may perform computing, storage, control, or networking aspects in the context of an IoT system arrangement. Other networked, aggregated, and distributed functions may exist in the edge cloud 1210 between the cloud data center layer 1340 and the client endpoints (e.g., client compute nodes 1502). Some of these are discussed in the following sections in the context of network functions or service virtualization, including the use of virtual edges and virtual services which are orchestrated for multiple stakeholders.

The edge gateway nodes 1512 and the edge aggregation nodes 1522 cooperate to provide various edge services and security to the client compute nodes 1502. Furthermore, because each client compute node 1502 may be stationary or mobile, each edge gateway node 1512 may cooperate with other edge gateway devices to propagate presently provided edge services and security as the corresponding client compute node 1502 moves about a region. To do so, each of the edge gateway nodes 1512 and/or edge aggregation nodes 1522 may support multiple tenancies and multiple stakeholder configurations, in which services from (or hosted for) multiple service providers and multiple consumers may be supported and coordinated across a single or multiple compute devices.

In further examples, any of the compute nodes or devices discussed with reference to the present computing systems and environment may be fulfilled based on the components depicted in FIGS. 16A and 16B. Each compute node may be embodied as a type of device, appliance, computer, or other "thing" capable of communicating with other edge, networking, or endpoint components.

Figure 16A:
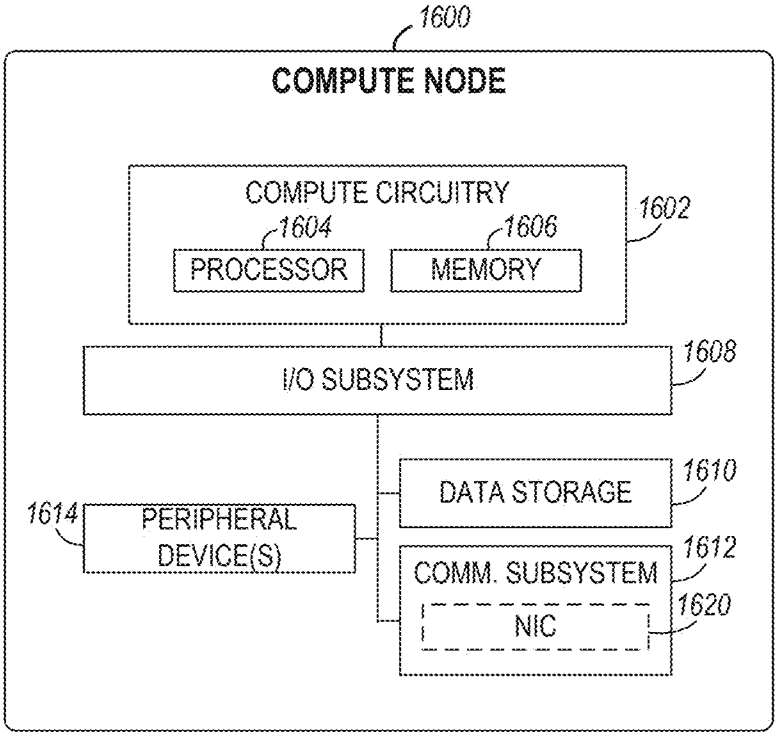
FIG. 16A illustrates an overview of example components deployed at a compute node system, according to an example.

In the simplified example depicted in FIG. 16A, an edge compute node 1600 includes a compute engine (also referred to herein as "compute circuitry") 1602, an input/output (I/O) subsystem 1608, data storage 1610, a communication circuitry subsystem 1612, and, optionally, one or more peripheral devices 1614. In other examples, each compute device may include other or additional components, such as those used in personal or server computing systems (e.g., a display, peripheral devices, etc.). Additionally, in some examples, one or more of the illustrative components may be incorporated in, or otherwise form a portion of, another component.

The compute node 1600 may be embodied as any type of engine, device, or collection of devices capable of performing various compute functions. In some examples, the compute node 1600 may be embodied as a single device such as an integrated circuit, an embedded system, a field-programmable gate array (FPGA), a system-on-a-chip (SOC), or other integrated system or device. In the illustrative example, the compute node 1600 includes or is embodied as a processor 1604 and a memory 1606. The processor 1604 may be embodied as any type of processor capable of performing the functions described herein (e.g., executing an application). For example, the processor 1604 may be embodied as a multi-core processor(s), a microcontroller, or other processor or processing/controlling circuit. In some examples, the processor 1604 may be embodied as, include, or be coupled to an FPGA, an application-specific integrated circuit (ASIC), reconfigurable hardware or hardware circuitry, or other specialized hardware to facilitate the performance of the functions described herein.

The main memory 1606 may be embodied as any type of volatile (e.g., dynamic random access memory (DRAM), etc.) or non-volatile memory or data storage capable of performing the functions described herein. Volatile memory may be a storage medium that requires power to maintain the state of data stored by the medium. Non-limiting examples of volatile memory may include various types of random access memory (RAM), such as DRAM or static random access memory (SRAM). One particular type of DRAM that may be used in a memory module is synchronous dynamic random access memory (SDRAM).

In one example, the memory device is a block addressable memory device, such as those based on NAND or NOR technologies. A memory device may also include a three-dimensional crosspoint memory device (e.g., Intel 3D XPoint™ memory), or other byte-addressable write-in-place nonvolatile memory devices. The memory device may refer to the die itself and/or to a packaged memory product. In some examples, 3D crosspoint memory (e.g., Intel 3D XPoint™ memory) may comprise a transistor-less stackable cross-point architecture in which memory cells sit at the intersection of word lines and bit lines and are individually addressable and in which bit storage is based on a change in bulk resistance. In some examples, all or a portion of the main memory 1606 may be integrated into the processor 1604. The main memory 1606 may store various software and data used during operation such as one or more applications, data operated on by the application(s), libraries, and drivers.

The compute circuitry 1602 is communicatively coupled to other components of the compute node 1600 via the I/O subsystem 1608, which may be embodied as circuitry and/or components to facilitate input/output operations with the compute circuitry 1602 (e.g., with the processor 1604 and/or the main memory 1606) and other components of the compute circuitry 1602. For example, the I/O subsystem 1608 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some examples, the I/O subsystem 1608 may form a portion of a system-on-a-chip (SoC) and be incorporated, along with one or more of the processor 1604, the main memory 1606, and other components of the compute circuitry 1602, into the compute circuitry 1602.

The one or more illustrative data storage devices 1610 may be embodied as any type of devices configured for short-term or long-term storage of data such as, for example, memory devices and circuits, memory cards, hard disk drives, solid-state drives, or other data storage devices. Each data storage device 1610 may include a system partition that stores data and firmware code for the data storage device 1610. Each data storage device 1610 may also include one or more operating system partitions that store data files and executables for operating systems depending on, for example, the type of compute node 1600.

The communication circuitry 1612 may be embodied as any communication circuit, device, or collection thereof, capable of enabling communications over a network between the compute circuitry 1602 and another compute device (e.g., an edge gateway node 1512 of the edge computing system 1600). The communication circuitry 1612 may be configured to use any one or more communication technology (e.g., wired or wireless communications) and associated protocols (e.g., a cellular networking protocol such a 3GPP 4G or 5G standard, a wireless local area network protocol such as IEEE 802.11/Wi-Fi®, a wireless wide area network protocol, Ethernet, Bluetooth®, etc.) to effect such communication.

The illustrative communication circuitry 1612 includes a network interface controller (NIC) 1620, which may also be referred to as a host fabric interface (HFI). The NIC 1620 may be embodied as one or more add-in-boards, daughter cards, network interface cards, controller chips, chipsets, or other devices that may be used by the compute node 1600 to connect with another compute device (e.g., an edge gateway node 1512). In some examples, the NIC 1620 may be embodied as part of a system-on-a-chip (SoC) that includes one or more processors or included on a multichip package that also contains one or more processors. In some examples, the NIC 1620 may include a local processor (not shown) and/or a local memory (not shown) that are both local to the NIC 1620. In such examples, the local processor of the NIC 1620 may be capable of performing one or more of the functions of the compute circuitry 1602 described herein. Additionally, the local memory of the NIC 1620 may be integrated into one or more components of the client compute node at the board level, socket level, chip level, and/or other levels.

Additionally, in some examples, each compute node 1600 may include one or more peripheral devices 1614. Such peripheral devices 1614 may include any type of peripheral device found in a compute device or server such as audio input devices, a display, other input/output devices, interface devices, and/or other peripheral devices, depending on the particular type of the compute node 1600. In further examples, the compute node 1600 may be embodied by a respective edge compute node in an edge computing system (e.g., client compute node 1502, edge gateway node 1512, edge aggregation node 1522) or like forms of appliances, computers, subsystems, circuitry, or other components.

Figure 16B:
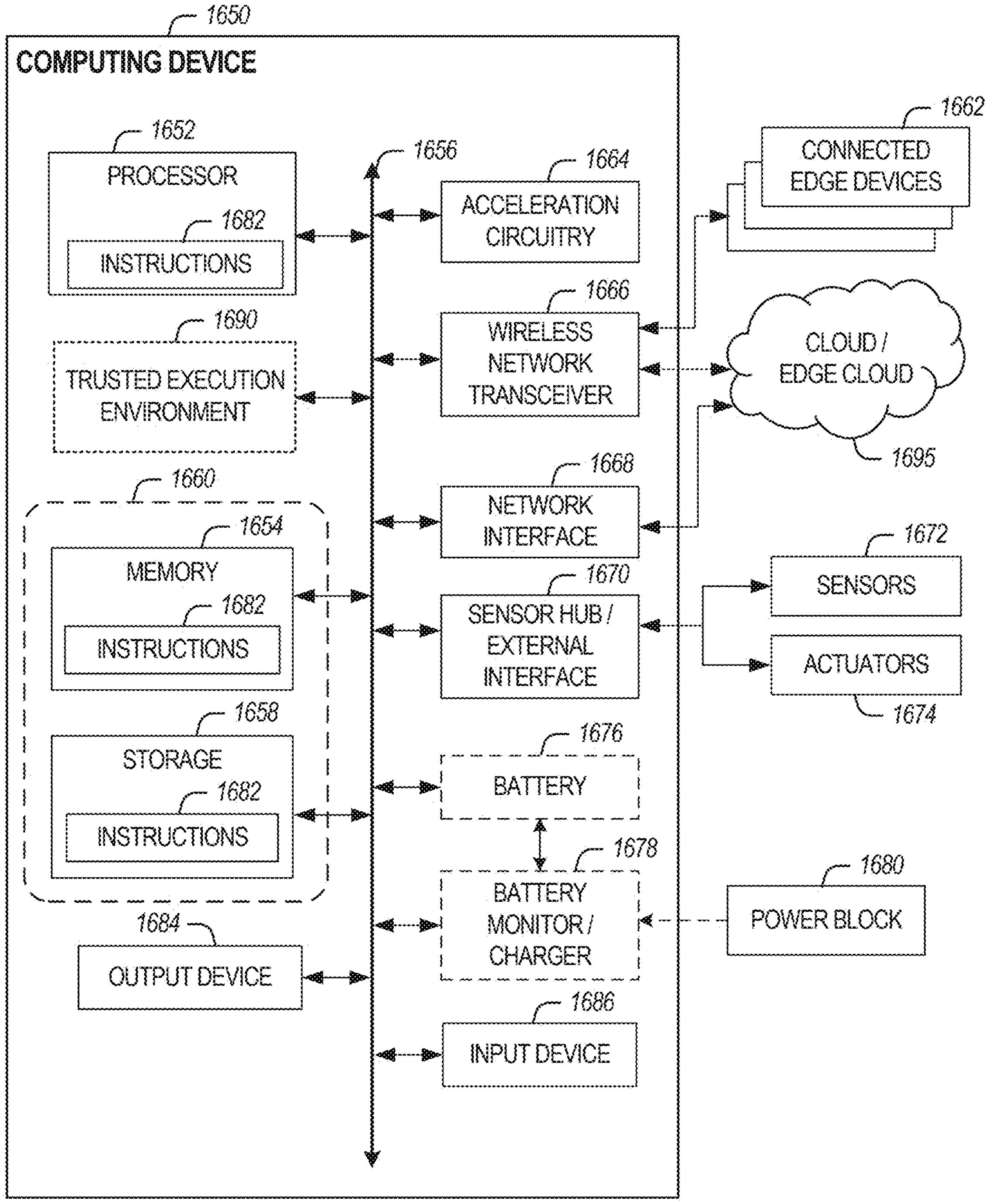
FIG. 16B illustrates a further overview of example components within a computing device, according to an example.

In a more detailed example, FIG. 16B illustrates a block diagram of an example of components that may be present in an edge computing node 1650 for implementing the techniques (e.g., operations, processes, methods, and methodologies) described herein. The edge computing node 1650 may include any combinations of the components referenced above, and it may include any device usable with an edge communication network or a combination of such networks. The components may be implemented as ICs, portions thereof, discrete electronic devices, or other modules, logic, hardware, software, firmware, or a combination thereof adapted in the edge computing node 1650, or as components otherwise incorporated within a chassis of a larger system. Further, to support the security examples provided herein, a hardware RoT (e.g., provided according to a DICE architecture) may be implemented in each IP block of the edge computing node 1650 such that any IP Block could boot into a mode where a RoT identity could be generated that may attest its identity and its current booted firmware to another IP Block or an external entity.

The edge computing node 1650 may include processing circuitry in the form of a processor 1652, which may be a microprocessor, a multi-core processor, a multithreaded processor, an ultra-low voltage processor, an embedded processor, or other known processing elements. The processor 1652 may be a part of a system on a chip (SoC) in which the processor 1652 and other components are formed into a single integrated circuit, or a single package, such as the Edison™ or Galileo™ SoC boards from Intel Corporation, Santa Clara, California. As an example, the processor 1652 may include an Intel® Architecture Core™ based processor, such as a Quark™, an Atom™, a Xeon™ an i3, an i5, an i7, an i9, or an MCU-class processor, or another such processor available from Intel®. However, any number of other processors may be used, such as available from Advanced Micro Devices, Inc. (AMD) of Sunnyvale, California, a MIPS-based design from MIPS Technologies, Inc. of Sunnyvale, California, an ARM-based design licensed from ARM Holdings, Ltd. or a customer thereof, or their licensees or adopters. The processors may include units such as an A5-A13 processor from Apple® Inc., a Snapdragon™ processor from Qualcomm® Technologies, Inc., or an OMAP™ processor from Texas Instruments, Inc.

The processor 1652 may communicate with a system memory 1654 over an interconnect 1656 (e.g., a bus). Any number of memory devices may be used to provide for a given amount of system memory. As examples, the memory may be random access memory (RAM) in accordance with a Joint Electron Devices Engineering Council (JEDEC) design such as the DDR or mobile DDR standards (e.g., LPDDR, LPDDR2, LPDDR3, or LPDDR4). In particular examples, a memory component may comply with a DRAM standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4. Such standards (and similar standards) may be referred to as DDR-based standards and communication interfaces of the storage devices that implement such standards may be referred to as DDR-based interfaces. In various implementations, the individual memory devices may be of any number of different package types such as single die package (SDP), dual die package (DDP), or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs.

To provide for persistent storage of information such as data, applications, operating systems, and so forth, a storage 1658 may also couple to the processor 1652 via the interconnect 1656. In an example, the storage 1658 may be implemented via a solid-state disk drive (SSDD). Other devices that may be used for the storage 1658 include flash memory cards, such as SD cards, microSD cards, XD picture cards, and the like, and USB flash drives. In an example, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magneto-resistive random access memory (MRAM) memory that incorporates memristor technology, resistive memory including the metal oxide base, the oxygen vacancy base and the conductive bridge Random Access Memory (CB-RAM), or spin-transfer torque (STT)-MRAM, a spintronic magnetic junction memory-based device, a magnetic tunneling junction (MTJ) based device, a DW (Domain Wall) and SOT (Spin-Orbit Transfer) based device, a thyristor-based memory device, or a combination of any of the above, or other memory.

In low-power implementations, the storage 1658 may be on-die memory or registers associated with the processor 1652. However, in some examples, the storage 1658 may be implemented using a micro hard disk drive (HDD). Further, any number of new technologies may be used for the storage 1658 in addition to, or instead of, the technologies described, such as resistance change memories, phase change memories, holographic memories, or chemical memories, among others.

The components may communicate over the interconnect 1656. The interconnect 1656 may include any number of technologies, including industry-standard architecture (ISA), extended ISA (EISA), peripheral component interconnect (PCI), peripheral component interconnect extended (PCIx), PCI express (PCIe), or any number of other technologies. The interconnect 1656 may be a proprietary bus, for example, used in an SoC-based system. Other bus systems may be included, such as an I2C interface, an SPI interface, point-to-point interfaces, and a power bus, among others.

The interconnect 1656 may couple the processor 1652 to a transceiver 1666, for communications with the connected edge devices 1662. The transceiver 1666 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the connected edge devices 1662. For example, a wireless local area network (WLAN) unit may be used to implement Wi-Fi® communications in accordance with the Institute of Electrical and Electronics Engineers (IEEE) 802.11 standard. Also, wireless wide area communications, e.g., according to a cellular or other wireless wide area protocol, may occur via a wireless wide area network (WWAN) unit.

The wireless network transceiver 1666 (or multiple transceivers) may communicate using multiple standards or radios for communications at a different range. For example, the edge computing node 1650 may communicate with close devices, e.g., within about 10 meters, using a local transceiver based on BLE, or another low power radio, to save power. More distant connected edge devices 1662, e.g., within about 50 meters, may be reached over ZigBee or other intermediate power radios. Both communications techniques may take place over a single radio at different power levels or may take place over separate transceivers, for example, a local transceiver using BLE and a separate mesh transceiver using ZigBee.

A wireless network transceiver 1666 (e.g., a radio transceiver) may be included to communicate with devices or services in the edge cloud 1695 via local or wide area network protocols. The wireless network transceiver 1666 may be an LPWA transceiver that follows the IEEE 802.15.4, or IEEE 802.15.4g standards, among others. The edge computing node 1650 may communicate over a wide area using LoRaWAN™ (Long Range Wide Area Network) developed by Semtech and the LoRa Alliance. The techniques described herein are not limited to these technologies but may be used with any number of other cloud transceivers that implement long-range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the wireless network transceiver 1666, as described herein. For example, the transceiver 1666 may include a cellular transceiver that uses spread spectrum (SPA/SAS) communications for implementing high-speed communications. Further, any number of other protocols may be used, such as Wi-Fi® networks for medium-speed communications and provision of network communications. The transceiver 1666 may include radios that are compatible with any number of 3GPP (Third Generation Partnership Project) specifications, such as Long Term Evolution (LTE) and 5th Generation (5G) communication systems, discussed in further detail at the end of the present disclosure. A network interface controller (NIC) 1668 may be included to provide a wired communication to nodes of the edge cloud 1695 or other devices, such as the connected edge devices 1662 (e.g., operating in a mesh). The wired communication may provide an Ethernet connection or may be based on other types of networks, such as Controller Area Network (CAN), Local Interconnect Network (LIN), DeviceNet, ControlNet, Data Highway+, PROFIBUS, or PROFINET, among many others. An additional NIC 1668 may be included to enable connecting to a second network, for example, a first NIC 1668 providing communications to the cloud over Ethernet, and a second NIC 1668 providing communications to other devices over another type of network.

Given the variety of types of applicable communications from the device to another component or network, applicable communications circuitry used by the device may include or be embodied by any one or more of components 1664, 1666, 1668, or 1670. Accordingly, in various examples, applicable means for communicating (e.g., receiving, transmitting, etc.) may be embodied by such communications circuitry.

The edge computing node 1650 may include or be coupled to acceleration circuitry 1664, which may be embodied by one or more AI accelerators, a neural compute stick, neuromorphic hardware, an FPGA, an arrangement of GPUs, one or more SoCs, one or more CPUs, one or more digital signal processors, dedicated ASICs, or other forms of specialized processors or circuitry designed to accomplish one or more specialized tasks. These tasks may include AI processing (including machine learning, training, inferencing, and classification operations), visual data processing, network data processing, object detection, rule analysis, or the like. Accordingly, in various examples, applicable means for acceleration may be embodied by such acceleration circuitry.

The interconnect 1656 may couple the processor 1652 to a sensor hub or external interface 1670 that is used to connect additional devices or subsystems. The devices may include sensors 1672, such as accelerometers, level sensors, flow sensors, optical light sensors, camera sensors, temperature sensors, global positioning system (GPS) sensors, pressure sensors, barometric pressure sensors, and the like. The hub or interface 1670 further may be used to connect the edge computing node 1650 to actuators 1674, such as power switches, valve actuators, an audible sound generator, a visual warning device, and the like.

In some optional examples, various input/output (I/O) devices may be present within or connected to, the edge computing node 1650. For example, a display or other output device 1684 may be included to show information, such as sensor readings or actuator position. An input device 1686, such as a touch screen or keypad may be included to accept input. An output device 1684 may include any number of forms of audio or visual display, including simple visual outputs such as binary status indicators (e.g., LEDs) and multi-character visual outputs, or more complex outputs such as display screens (e.g., LCD screens), with the output of characters, graphics, multimedia objects, and the like being generated or produced from the operation of the edge computing node 1650.

A battery 1676 may power the edge computing node 1650, although, in examples in which the edge computing node 1650 is mounted in a fixed location, it may have a power supply coupled to an electrical grid. The battery 1676 may be a lithium-ion battery, or a metal-air battery, such as a zinc-air battery, an aluminum-air battery, a lithium-air battery, and the like.

A battery monitor/charger 1678 may be included in the edge computing node 1650 to track the state of charge (SoCh) of the battery 1676. The battery monitor/charger 1678 may be used to monitor other parameters of the battery 1676 to provide failure predictions, such as the state of health (SoH) and the state of function (SoF) of the battery 1676. The battery monitor/charger 1678 may include a battery monitoring integrated circuit, such as an LTC4020 or an LTC2990 from Linear Technologies, an ADT7488A from ON Semiconductor of Phoenix Arizona, or an IC from the UCD90xxx family from Texas Instruments of Dallas, TX. The battery monitor/charger 1678 may communicate the information on the battery 1676 to the processor 1652 over the interconnect 1656. The battery monitor/charger 1678 may also include an analog-to-digital (ADC) converter that enables the processor 1652 to directly monitor the voltage of the battery 1676 or the current flow from the battery 1676. The battery parameters may be used to determine actions that the edge computing node 1650 may perform, such as transmission frequency, mesh network operation, sensing frequency, and the like.

A power block 1680, or other power supply coupled to a grid, may be coupled with the battery monitor/charger 1678 to charge the battery 1676. In some examples, the power block 1680 may be replaced with a wireless power receiver to obtain the power wirelessly, for example, through a loop antenna in the edge computing node 1650. A wireless battery charging circuit, such as an LTC4020 chip from Linear Technologies of Milpitas, California, among others, may be included in the battery monitor/charger 1678. The specific charging circuits may be selected based on the size of the battery 1676, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The storage 1658 may include instructions 1682 in the form of software, firmware, or hardware commands to implement the techniques described herein. Although such instructions 1682 are shown as code blocks included in the memory 1654 and the storage 1658, it may be understood that any of the code blocks may be replaced with hardwired circuits, for example, built into an application-specific integrated circuit (ASIC).

In an example, the instructions 1682 provided via the memory 1654, the storage 1658, or the processor 1652 may be embodied as a non-transitory, machine-readable medium 1660 including code to direct the processor 1652 to perform electronic operations in the edge computing node 1650. The processor 1652 may access the non-transitory, machine-readable medium 1660 over the interconnect 1656. For instance, the non-transitory, machine-readable medium 1660 may be embodied by devices described for the storage 1658 or may include specific storage units such as optical disks, flash drives, or any number of other hardware devices. The non-transitory, machine-readable medium 1660 may include instructions to direct the processor 1652 to perform a specific sequence or flow of actions, for example, as described with respect to the flowchart(s) and block diagram (s) of operations and functionality depicted above. As used in, the terms "machine-readable medium" and "computer-readable medium" are interchangeable.

In further examples, a machine-readable medium also includes any tangible medium that is capable of storing, encoding, or carrying instructions for execution by a machine and that cause the machine to perform any one or more of the methodologies of the present disclosure or that is capable of storing, encoding or carrying data structures utilized by or associated with such instructions. A "machine-readable medium" thus may include but is not limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks. The instructions embodied by a machine-readable medium may further be transmitted or received over a communications network using a transmission medium via a network interface device utilizing any one of a number of transfer protocols (e.g., HTTP).

A machine-readable medium may be provided by a storage device or other apparatus which is capable of hosting data in a non-transitory format. In an example, information stored or otherwise provided on a machine-readable medium may be representative of instructions, such as instructions themselves or a format from which the instructions may be derived. This format from which the instructions may be derived may include source code, encoded instructions (e.g., in compressed or encrypted form), packaged instructions (e.g., split into multiple packages), or the like. The information representative of the instructions in the machine-readable medium may be processed by processing circuitry into the instructions to implement any of the operations discussed herein. For example, deriving the instructions from the information (e.g., processing by the processing circuitry) may include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions.

In an example, the derivation of the instructions may include assembly, compilation, or interpretation of the information (e.g., by the processing circuitry) to create the instructions from some intermediate or preprocessed format provided by the machine-readable medium. The information, when provided in multiple parts, may be combined, unpacked, and modified to create the instructions. For example, the information may be in multiple compressed source code packages (or object code, or binary executable code, etc.) on one or several remote servers. The source code packages may be encrypted when in transit over a network and decrypted, uncompressed, assembled (e.g., linked) if necessary, and compiled or interpreted (e.g., into a library, stand-alone executable, etc.) at a local machine, and executed by the local machine.

Each of the block diagrams of FIGS. 16A and 16B are intended to depict a high-level view of components of a device, subsystem, or arrangement of an edge computing node. However, it will be understood that some of the components shown may be omitted, additional components may be present, and a different arrangement of the components shown may occur in other implementations.

Figure 17:
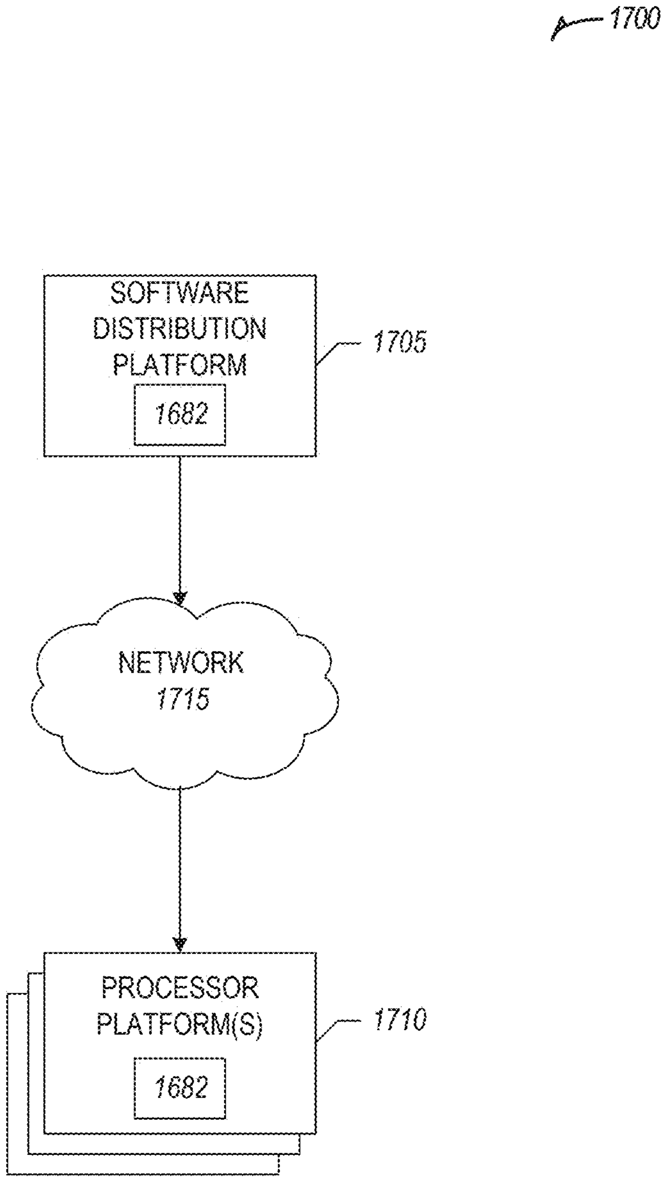
FIG. 17 illustrates a software distribution platform to distribute software instructions and derivatives, according to an example.

FIG. 17 illustrates an example software distribution platform 1705 to distribute software, such as the example computer-readable instructions 1682 of FIG. 16B, to one or more devices, such as processor platform(s) 1710 and/or other example connected edge devices or systems discussed herein. The example software distribution platform 1705 may be implemented by any computer server, data facility, cloud service, etc., capable of storing and transmitting software to other computing devices. Example connected edge devices may be customers, clients, managing devices (e.g., servers), third parties (e.g., customers of an entity owning and/or operating the software distribution platform 1705). Example connected edge devices may operate in commercial and/or home automation environments. In some examples, a third party is a developer, a seller, and/or a licensor of software such as the example computer-readable instructions 1682 of FIG. 16B. The third parties may be consumers, users, retailers, OEMs, etc. that purchase and/or license the software for use and/or re-sale and/or sub-licensing. In some examples, distributed software causes the display of one or more user interfaces (UIs) and/or graphical user interfaces (GUIs) to identify the one or more devices (e.g., connected edge devices) geographically and/or logically separated from each other (e.g., physically separated IoT devices chartered with the responsibility of water distribution control (e.g., pumps), electricity distribution control (e.g., relays), etc.).

In the illustrated example of FIG. 17, the software distribution platform 1705 includes one or more servers and one or more storage devices that store the computer-readable instructions 1682. The one or more servers of the example software distribution platform 1705 are in communication with a network 1715, which may correspond to any one or more of the Internet and/or any of the example networks described above. In some examples, one or more servers are responsive to requests to transmit the software to a requesting party as part of a commercial transaction. Payment for the delivery, sale, and/or license of the software may be handled by one or more servers of the software distribution platform and/or via a third-party payment entity. The servers enable purchasers and/or licensors to download the computer-readable instructions 1682 from the software distribution platform 1705. For example, the software, which may correspond to example computer-readable instructions, may be downloaded to the example processor platform(s), which is/are to execute the computer-readable instructions 1682. In some examples, one or more servers of the software distribution platform 1705 are communicatively connected to one or more security domains and/or security devices through which requests and transmissions of the example computer-readable instructions 1682 must pass. In some examples, one or more servers of the software distribution platform 1705 periodically offer, transmit, and/or force updates to the software (e.g., the example computer-readable instructions 1682 of FIG. 16B) to ensure improvements, patches, updates, etc. are distributed and applied to the software at the end-user devices.

In the illustrated example of FIG. 17, the computer-readable instructions 1682 are stored on storage devices of the software distribution platform 1705 in a particular format. A format of computer-readable instructions includes, but is not limited to a particular code language (e.g., Java, JavaScript, Python, C, C#, SQL, HTML, etc.), and/or a particular code state (e.g., uncompiled code (e.g., ASCII), interpreted code, linked code, executable code (e.g., a binary), etc.). In some examples, the computer-readable instructions 1682 stored in the software distribution platform 1705 are in a first format when transmitted to the example processor platform(s) 1710. In some examples, the first format is an executable binary in which particular types of the processor platform(s) 1710 can execute. However, in some examples, the first format is uncompiled code that requires one or more preparation tasks to transform the first format to a second format to enable execution on the example processor platform(s) 1710. For instance, the receiving processor platform(s) 1700 may need to compile the computer-readable instructions 1682 in the first format to generate executable code in a second format that is capable of being executed on the processor platform(s) 1710. In still other examples, the first format is interpreted code that, upon reaching the processor platform(s) 1710, is interpreted by an interpreter to facilitate the execution of instructions.

Figure 18:
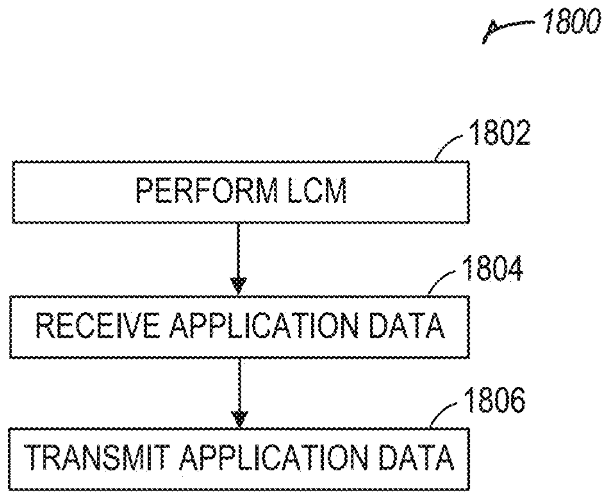
FIG. 18 illustrates a method, according to an example.

FIG. 18 illustrates a method, according to an example. The method 1800 shown in FIG. 18 contains multiple operations, although other operations may be present. The method 1800 reflects the implementation previously described herein and thus will not be replicated here for brevity.

At operation 1802, LCM operations of MEC and EDGEAPP applications are performed in an operator platform instance in an operator platform domain, to enable coordination of the MEC and EDGEAPP applications in the MEC system and the EDGEAPP system respectively. In some examples, the operator platform domain includes a plurality of federated operator platform instances, and the plurality of federated operator platform instances are hosted on respective computing systems. In some examples, the LCM operations are performed on the MEC and EDGEAPP applications using dedicated interfaces defined between the MEC system and the EDGEAPP system. In some examples, the LCM operations are performed by a MEC Orchestrator of the MEC system, and the MEC Orchestrator is connected via a reference point network connection to an ECS of the EDGEAPP system. In addition, capabilities of the operator platform instance are identified within the operator platform domain using a MEC capability exposer component operating within a MEC Federator of the MEC system. In some examples, the LCM operations are coordinated between an ECS of the EDGEAPP system and an Edge Federator of the MEC system, and the operator platform instance includes an OSS of the MEC system and an ECSP management system of the EDGEAPP system to manage use of the MEC and EDGEAPP applications. In some examples, the LCM operations are integrated using an LCM aggregator, and the LCM aggregator is connected to a MEC Orchestrator of the MEC system and to the ECS of the EDGEAPP system. In some examples, the LCM operations are coordinated between a MEC orchestrator of the MEC system and an ECS of the EDGEAPP system, and each of the MEC system and the EDGEAPP system provide respective components to implement the LCM operations in the respective systems. In some examples, the EDGEAPP system and the MEC system are connected using application programming interfaces provided by a CAMARA architecture. In some examples, the MEC system operates according to at least one standard from a ETSI MEC standards family, and wherein the EDGEAPP system operates according to at least one standard from a 3GPP standards family.

At operation 1804, application data is received from an application client of a UE. The application client is associated with one of the MEC system or the EDGEAPP system.

At operation 1806, the application data is transmitted to an application host executed on the other of the MEC system or the EDGEAPP system.

ADDITIONAL NOTES AND EXAMPLES

Additional examples of the presently described method, system, and device embodiments include the following, non-limiting implementations. Each of the following non-limiting examples may stand on its own or may be combined in any permutation or combination with any one or more of the other examples provided below or throughout the present disclosure.

Example 1 is a computing system, comprising: processing circuitry; and a memory device including instructions embodied thereon, wherein the instructions, which when executed by the processing circuitry, configure the processing circuitry for coordinating operations of a multi-access edge computing (MEC) system and an EDGEAPP system, with operations to: perform lifecycle management (LCM) operations of MEC and EDGEAPP applications in an Operator Platform instance in an Operator Platform domain, to enable coordination of the MEC and EDGEAPP applications in the MEC system and the EDGEAPP system respectively; receive application data from an application client of a user equipment (UE), wherein the application client is associated with one of the MEC system or the EDGEAPP system; and transmit the application data to an application host executed on the other of the MEC system or the EDGEAPP system.

In Example 2, the subject matter of Example 1 optionally includes subject matter where the operator platform domain includes a plurality of federated Operator Platform instances, and wherein the plurality of federated Operator Platform instances are hosted on respective computing systems.

In Example 3, the subject matter of any one or more of Examples 1-2 optionally include subject matter where the LCM operations are performed on the MEC and EDGEAPP applications using dedicated interfaces defined between the MEC system and the EDGEAPP system.

In Example 4, the subject matter of any one or more of Examples 1-3 optionally include subject matter where the LCM operations are performed by a MEC Orchestrator of the MEC system, and wherein the MEC Orchestrator is connected via a reference point network connection to an Edge Configuration Server (ECS) of the EDGEAPP system.

In Example 5, the subject matter of Example 4 optionally includes subject matter where capabilities of the Operator Platform instance are identified within the operator platform domain using a MEC capability exposer component operating within a MEC Federator of the MEC system.

In Example 6, the subject matter of any one or more of Examples 1-5 optionally include subject matter where the LCM operations are coordinated between an Edge Configuration Server (ECS) of the EDGEAPP system and an Edge Federator of the MEC system, and wherein the Operator Platform instance includes an Operations Support System (OSS) of the MEC system and an Edge Cloud Service Provider (ECSP) management system of the EDGEAPP system to manage use of the MEC and EDGEAPP applications.

In Example 7, the subject matter of Example 6 optionally includes subject matter where the LCM operations are integrated using an LCM aggregator, and wherein the LCM aggregator is connected to a MEC Orchestrator of the MEC system and to the ECS of the EDGEAPP system.

In Example 8, the subject matter of any one or more of Examples 1-7 optionally include subject matter where the LCM operations are coordinated between a MEC orchestrator of the MEC system and an Edge Configuration Server (ECS) of the EDGEAPP system, and wherein each of the MEC system and the EDGEAPP system provide respective components to implement the LCM operations in the respective systems.

In Example 9, the subject matter of any one or more of Examples 1-8 optionally include subject matter where the EDGEAPP system and the MEC system are connected using application programming interfaces provided by a CAMARA architecture.

In Example 10, the subject matter of any one or more of Examples 1-9 optionally include subject matter where the MEC system operates according to at least one standard from a ETSI MEC standards family, and wherein the EDGEAPP system operates according to at least one standard from a 3GPP standards family.

Example 11 is a method for coordinating operations of a multi-access edge computing (MEC) system and an EDGEAPP system, comprising: performing lifecycle management (LCM) operations of MEC and EDGEAPP applications in an Operator Platform instance in an Operator Platform domain, to enable coordination of the MEC and EDGEAPP applications in the MEC system and the EDGEAPP system respectively; receiving application data from an application client of a user equipment (UE), wherein the application client is associated with one of the MEC system or the EDGEAPP system; and transmitting the application data to an application host executed on the other of the MEC system or the EDGEAPP system.

In Example 12, the subject matter of Example 11 optionally includes subject matter where the operator platform domain includes a plurality of federated Operator Platform instances, and wherein the plurality of federated Operator Platform instances are hosted on respective computing systems.

In Example 13, the subject matter of any one or more of Examples 11-12 optionally include subject matter where the LCM operations are performed on the MEC and EDGEAPP applications using dedicated interfaces defined between the MEC system and the EDGEAPP system.

In Example 14, the subject matter of any one or more of Examples 11-13 optionally include subject matter where the LCM operations are performed by a MEC Orchestrator of the MEC system, and wherein the MEC Orchestrator is connected via a reference point network connection to an Edge Configuration Server (ECS) of the EDGEAPP system.

In Example 15, the subject matter of Example 14 optionally includes subject matter where capabilities of the Operator Platform instance are identified within the operator platform domain using a MEC capability exposer component operating within a MEC Federator of the MEC system.

In Example 16, the subject matter of any one or more of Examples 11-15 optionally include subject matter where the LCM operations are coordinated between an Edge Configuration Server (ECS) of the EDGEAPP system and an Edge Federator of the MEC system, and wherein the Operator Platform instance includes an Operations Support System (OSS) of the MEC system and an Edge Cloud Service Provider (ECSP) management system of the EDGEAPP system to manage use of the MEC and EDGEAPP applications.

In Example 17, the subject matter of Example 16 optionally includes subject matter where the LCM operations are integrated using an LCM aggregator, and wherein the LCM aggregator is connected to a MEC Orchestrator of the MEC system and to the ECS of the EDGEAPP system.

In Example 18, the subject matter of any one or more of Examples 11-17 optionally include subject matter where the LCM operations are coordinated between a MEC orchestrator of the MEC system and an Edge Configuration Server (ECS) of the EDGEAPP system, and wherein each of the MEC system and the EDGEAPP system provide respective components to implement the LCM operations in the respective systems.

In Example 19, the subject matter of any one or more of Examples 11-18 optionally include subject matter where the EDGEAPP system and the MEC system are connected using application programming interfaces provided by a CAMARA architecture.

In Example 20, the subject matter of any one or more of Examples 11-19 optionally include subject matter where the MEC system operates according to at least one standard from a ETSI MEC standards family, and wherein the EDGEAPP system operates according to at least one standard from a 3GPP standards family.

Example 21 is at least one machine-readable medium capable of storing instructions for coordinating operations of a multi-access edge computing (MEC) system and an EDGEAPP system, wherein the instructions when executed by at least one processor cause the at least one processor to: perform lifecycle management (LCM) operations of MEC and EDGEAPP applications in an Operator Platform instance in an Operator Platform domain, to enable coordination of the MEC and EDGEAPP applications in the MEC system and the EDGEAPP system respectively; receive application data from an application client of a user equipment (UE), wherein the application client is associated with one of the MEC system or the EDGEAPP system; and transmit the application data to an application host executed on the other of the MEC system or the EDGEAPP system.

In Example 22, the subject matter of Example 21 optionally includes subject matter where the operator platform domain includes a plurality of federated Operator Platform instances, and wherein the plurality of federated Operator Platform instances are hosted on respective computing systems.

In Example 23, the subject matter of any one or more of Examples 21-22 optionally include subject matter where the LCM operations are performed on the MEC and EDGEAPP applications using dedicated interfaces defined between the MEC system and the EDGEAPP system.

In Example 24, the subject matter of any one or more of Examples 21-23 optionally include subject matter where the LCM operations are performed by a MEC Orchestrator of the MEC system, and wherein the MEC Orchestrator is connected via a reference point network connection to an Edge Configuration Server (ECS) of the EDGEAPP system.

In Example 25, the subject matter of Example 24 optionally includes subject matter where capabilities of the Operator Platform instance are identified within the operator platform domain using a MEC capability exposer component operating within a MEC Federator of the MEC system.

In Example 26, the subject matter of any one or more of Examples 21-25 optionally include subject matter where the LCM operations are coordinated between an Edge Configuration Server (ECS) of the EDGEAPP system and an Edge Federator of the MEC system, and wherein the Operator Platform instance includes an Operations Support System (OSS) of the MEC system and an Edge Cloud Service Provider (ECSP) management system of the EDGEAPP system to manage use of the MEC and EDGEAPP applications.

In Example 27, the subject matter of Example 26 optionally includes subject matter where the LCM operations are integrated using an LCM aggregator, and wherein the LCM aggregator is connected to a MEC Orchestrator of the MEC system and to the ECS of the EDGEAPP system.

In Example 28, the subject matter of any one or more of Examples 21-27 optionally include subject matter where the LCM operations are coordinated between a MEC orchestrator of the MEC system and an Edge Configuration Server (ECS) of the EDGEAPP system, and wherein each of the MEC system and the EDGEAPP system provide respective components to implement the LCM operations in the respective systems.

In Example 29, the subject matter of any one or more of Examples 21-28 optionally include subject matter where the EDGEAPP system and the MEC system are connected using application programming interfaces provided by a CAMARA architecture.

In Example 30, the subject matter of any one or more of Examples 21-29 optionally include subject matter where the MEC system operates according to at least one standard from a ETSI MEC standards family, and wherein the EDGEAPP system operates according to at least one standard from a 3GPP standards family.

Although these implementations have been described concerning specific exemplary aspects, it will be evident that various modifications and changes may be made to these aspects without departing from the broader scope of the present disclosure. Many of the arrangements and processes described herein can be used in combination or in parallel implementations that involve terrestrial network connectivity (where available) to increase network bandwidth/throughput and to support additional edge services. Accordingly, the specification and drawings are to be regarded in an illustrative rather than a restrictive sense. The accompanying drawings that form a part hereof show, by way of illustration, and not of limitation, specific aspects in which the subject matter may be practiced. The aspects illustrated are described in sufficient detail to enable those skilled in the art to practice the teachings disclosed herein. Other aspects may be utilized and derived therefrom, such that structural and logical substitutions and changes may be made without departing from the scope of this disclosure. This Detailed Description, therefore, is not to be taken in a limiting sense, and the scope of various aspects is defined only by the appended claims, along with the full range of equivalents to which such claims are entitled.

Such aspects of the inventive subject matter may be referred to herein, individually and/or collectively, merely for convenience and without intending to voluntarily limit the scope of this application to any single aspect or inventive concept if more than one is disclosed. Thus, although specific aspects have been illustrated and described herein, it should be appreciated that any arrangement calculated to achieve the same purpose may be substituted for the specific aspects shown. This disclosure is intended to cover any adaptations or variations of various aspects. Combinations of the above aspects and other aspects not specifically described herein will be apparent to those of skill in the art upon reviewing the above description.

What is claimed is:

1. A computing system, comprising:

processing circuitry; and a memory device including instructions embodied thereon, wherein the instructions, which when executed by the processing circuitry, configure the processing circuitry for coordinating operations between a multi-access edge computing (MEC) system and an EDGEAPP system, with operations to:

perform lifecycle management (LCM) operations of MEC and EDGEAPP applications in an Operator Platform instance in an Operator Platform domain, to enable coordination of the MEC and EDGEAPP applications in the MEC system and the EDGEAPP system respectively;

receive application data from an application client of a user equipment (UE), wherein the application client is associated with a first system selected from the MEC system and the EDGEAPP system; and transmit the application data to an application host executed on a second system selected from the MEC system and the EDGEAPP system, wherein the first system is different than the second system, wherein operator platform domain includes a plurality of federated Operator Platform instances, and wherein each of the plurality of federated Operator Platform instances is hosted on a different computing system.

2. The computing system of claim 1, wherein the LCM operations are performed on the MEC and EDGEAPP applications using dedicated interfaces defined between the MEC system and the EDGEAPP system.

3. The computing system of claim 1, wherein the LCM operations are performed by a MEC Orchestrator of the MEC system, and wherein the MEC Orchestrator is connected via a reference point network connection to an Edge Configuration Server (ECS) of the EDGEAPP system.

4. The computing system of claim 3, wherein capabilities of the Operator Platform instance are identified within the operator platform domain using a MEC capability exposer component operating within a MEC Federator of the MEC system.

5. The computing system of claim 1, wherein the LCM operations are coordinated between an Edge Configuration Server (ECS) of the EDGEAPP system and an Edge Federator of the MEC system, and wherein the Operator Platform instance includes an Operations Support System (OSS) of the MEC system and an Edge Cloud Service Provider (ECSP) management system of the EDGEAPP system to manage use of the MEC and EDGEAPP applications.

6. The computing system of claim 5, wherein the LCM operations are integrated using an LCM aggregator, and wherein the LCM aggregator is connected to a MEC Orchestrator of the MEC system and to the ECS of the EDGEAPP system.

7. The computing system of claim 1, wherein the LCM operations are coordinated between a MEC orchestrator of the MEC system and an Edge Configuration Server (ECS) of the EDGEAPP system, and wherein each of the MEC system and the EDGEAPP system provide respective components to implement the LCM operations in the respective systems.

8. The computing system of claim 1, wherein the EDGEAPP system and the MEC system are connected using application programming interfaces provided by a CAMARA architecture.

9. A method for coordinating operations of a multi-access edge computing (MEC) system and an EDGEAPP system, comprising:

performing lifecycle management (LCM) operations of MEC and EDGEAPP applications in an Operator Platform instance in an Operator Platform domain, to enable coordination of the MEC and EDGEAPP applications in the MEC system and the EDGEAPP system respectively;

receiving application data from an application client of a user equipment (UE), wherein the application client is associated with a first system selected from the MEC system and the EDGEAPP system; and transmitting the application data to an application host executed on a second system selected from the MEC system and the EDGEAPP system, wherein the first system is different than the second system, wherein the operator platform domain includes a plurality of federated Operator Platform instances and wherein the plurality of federated Operator Platform instances are hosted on respective computing systems.

10. The method of claim 9, wherein the LCM operations are performed on the MEC and EDGEAPP applications using dedicated interfaces defined between the MEC system and the EDGEAPP system.

11. The method of claim 9, wherein the LCM operations are performed by a MEC Orchestrator of the IEC system, and wherein the MEC Orchestrator is connected via a reference point network connection to an Edge Configuration Server (ECS) of the EDGEAPP system.

12. The method of claim 11, wherein capabilities of the Operator Platform instance are identified within the operator platform domain using a MEC capability exposer component operating within a MEC Federator of the MEC system.

13. The method of claim 9, wherein the LCM operations are coordinated between an Edge Configuration Server (ECS) of the EDGEAPP system and an Edge Federator of the MEC system, and wherein the Operator Platform instance includes an Operations Support System (OSS) of the MEC system and an Edge Cloud Service Provider (ECSP) management system of the EDGEAPP system to manage use of the MEC and EDGEAPP applications.

14. The method of claim 13, wherein the LCM operations are integrated using an LCM aggregator, and wherein the LCM aggregator is connected to a MEC Orchestrator of the MEC system and to the ECS of the EDGEAPP system.

15. The method of claim 9, wherein the LCM operations are coordinated between a MEC orchestrator of the MEC system and an Edge Configuration Server (ECS) of the EDGEAPP system, and wherein each of the MEC system and the EDGEAPP system provide respective components to implement the LCM operations in the respective systems.

16. The method of claim 9, wherein the EDGEAPP system and the MEC system are connected using application programming interfaces provided by a CAMARA architecture.

17. A computing system, comprising:

processing circuitry; and a memory device including instructions embodied thereon, wherein the instructions, which when executed by the processing circuitry, configure the processing circuitry for coordinating operations between a multi-access edge computing (MEC) system and an EDGEAPP system, with operations to:

perform lifecycle management (LCM) operations of MEC and EDGEAPP applications in an Operator Platform instance in an Operator Platform domain, to enable coordination of the MEC and EDGEAPP applications in the MEC system and the EDGEAPP system respectively;

receive application data from an application client of a user equipment (UE), wherein the application client is associated with a first system selected from the MEC system and the EDGEAPP system; and transmit the application data to an application host executed on a second system selected from the MEC system and the EDGEAPP system, wherein the first system is different than the second system, and wherein the LCM operations are performed on the MEC and EDGEAPP applications using dedicated interfaces defined between the MEC system and the EDGEAPP system.

18. The computing system of claim 17, wherein:

the LCM operations are performed by a MEC Orchestrator of the MEC system, the MEC Orchestrator is connected via a reference point network connection to an Edge Configuration Server (ECS) of the EDGEAPP system, and capabilities of the Operator Platform instance are identified within the operator platform domain using a MEC capability exposer component operating within a MEC Federator of the MEC system.

19. The computing system of claim 17, wherein the LCM operations are coordinated between an Edge Configuration Server (ECS) of the EDGEAPP system and an Edge Federator of the MEC system, and wherein the Operator Platform instance includes an Operations Support System (OSS) of the MEC system and an Edge Cloud Service Provider (ECSP) management system of the EDGEAPP system to manage use of the MEC and EDGEAPP applications.

20. The computing system of claim 17, wherein the EDGEAPP system and the MEC system are connected using application programming interfaces provided by a CAMARA architecture.

* * * * *